US012680927B2

(12) United States Patent
Asif et al.

(10) Patent No.: US 12,680,927 B2
(45) Date of Patent: Jul. 14, 2026

(54) ENVIRONMENTAL CONDITIONING MECHANICAL TEST SYSTEM

(71) Applicant: Bruker Nano, Inc., Santa Barbara, CA (US)

(72) Inventors: Syed Amanulla Syed Asif, Bloomington, MN (US); Edward Cyrankowski, Woodbury, MN (US); Bartosz Nowakowski, Plymouth, MN (US); Douglas D. Stauffer, Minneapolis, MN (US)

(73) Assignee: Bruker Nano, Inc., Santa Barbara, CA (US)

( * ) Notice: Subject to any disclaimer, the term of this patent is extended or adjusted under 35 U.S.C. 154(b) by 224 days.

(21) Appl. No.: 18/676,849

(22) Filed: May 29, 2024

(65) Prior Publication Data

US 2024/0319055 A1     Sep. 26, 2024

Related U.S. Application Data

(63) Continuation of application No. 16/763,319, filed as application No. PCT/US2018/060845 on Nov. 13, 2018, now Pat. No. 12,000,802.

(Continued)

(51) Int. Cl.
*G01N 3/06* (2006.01)

(52) U.S. Cl.
CPC ............. *G01N 3/062* (2013.01); *G01N 3/068* (2013.01); *G01N 2203/0226* (2013.01); *G01N 2291/02845* (2013.01); *G01N 2291/02872* (2013.01)

(58) Field of Classification Search
CPC .. G01N 33/15; G01N 13/00; G01N 2013/006; G01N 33/24; G01N 33/383;
(Continued)

(56) References Cited

U.S. PATENT DOCUMENTS

| 2,942,455 A | 6/1960 | Smith |
| 5,202,542 A | 4/1993 | Stanley |
(Continued)

FOREIGN PATENT DOCUMENTS

WO      WO-2012109577 A2 *   8/2021   ........... G01B 21/047

OTHER PUBLICATIONS

"Extended European Search Report," for European Patent Application No. 25200523.6 mailed Dec. 4, 2025 (12 pages).
(Continued)

*Primary Examiner* — Andre J Allen
(74) *Attorney, Agent, or Firm* — Pauly, DeVries Smith & Deffner LLC

(57) ABSTRACT

Among other things, a heating jacket configured for heating a mechanical testing instrument having a probe is disclosed herein. The heating jacket includes a heating element including a jacket wall, and the jacket wall extends around a probe recess, the jacket wall is configured to receive a probe of a mechanical testing instrument within the probe recess, and the heating element is mechanically isolated from the probe with a probe gap. Additionally, a system to correct for thermomechanical drift in a mechanical testing assembly is disclosed herein. The system isolates the mechanical testing instrument from thermomechanical drift of a system frame using a determined difference between, for instance, a probe displacement and a sample displacement.

20 Claims, 8 Drawing Sheets

Related U.S. Application Data

(60) Provisional application No. 62/585,516, filed on Nov. 13, 2017.

(58) Field of Classification Search
CPC ........... G01N 2033/0091; G01N 17/00; G01N 11/00; G01N 3/08; G01N 33/442; G01N 2035/00198; G01N 11/02; G01N 33/12; G01N 33/00; G01N 5/04; G01N 33/02; G01N 33/20; G01N 15/0893; G01N 19/04; G01N 3/40; G01N 33/46; G01N 13/04; G01N 15/08; G01N 33/42; G01N 33/10; G01N 13/02; G01N 15/088; G01N 17/002; G01N 3/56; G01N 3/00; G01N 33/44; G01N 15/0272; G01N 5/00; G01N 11/04; G01N 3/10; G01N 3/565; G01N 33/362; G01N 1/20; G01N 1/286; G01N 2203/0226; G01N 29/11; G01N 33/367; G01N 33/445; G01N 5/02; G01N 15/0826; G01N 2203/0284; G01N 3/32; G01N 33/346; G01N 1/40; G01N 19/10; G01N 2013/003; G01N 2203/0025; G01N 2203/0085; G01N 2203/0232; G01N 25/00; G01N 3/42; G01N 33/32; G01N 33/38; G01N 33/388; G01N 1/34; G01N 1/405; G01N 11/14; G01N 2203/0222; G01N 2203/0298; G01N 27/041; G01N 33/06; G01N 33/241; G01N 1/28; G01N 15/02; G01N 15/04; G01N 2001/2223; G01N 2013/0225; G01N 2033/0077; G01N 21/3563; G01N 21/359; G01N 2203/0282; G01N 2291/044; G01N 3/18; G01N 3/28; G01N 31/00; G01N 33/03; G01N 33/208; G01N 33/36; G01N 7/14; G01N 9/02; G01N 17/004; G01N 19/02; G01N 2001/4061; G01N 2015/0096; G01N 21/4738; G01N 2203/0019; G01N 2203/0023; G01N 2203/0042; G01N 2203/0087; G01N 2203/0092; G01N 2203/0676; G01N 25/18; G01N 27/72; G01N 29/036; G01N 29/30; G01N 3/567; G01N 30/02; G01N 33/0098; G01N 33/246; G01N 33/386; G01N 33/50; G01N 33/528; G01N 35/0099; G01N 35/025; G01N 9/00; G01N 9/36; G01N 1/2294; G01N 1/38; G01N 19/00; G01N 2001/022; G01N 2021/6484; G01N 2030/027; G01N 21/65; G01N 22/00; G01N 2203/0057; G01N 2203/0067; G01N 2203/0082; G01N 2203/0246; G01N 2203/0256; G01N 2203/0296; G01N 2291/0232; G01N 2291/02827; G01N 23/20; G01N 27/023; G01N 29/04; G01N 29/045; G01N 3/04; G01N 33/204; G01N 33/34; G01N 33/48771; G01N 1/02; G01N 11/06; G01N 11/10; G01N 15/0205; G01N 17/04; G01N 17/043; G01N 2001/024; G01N 2013/0275; G01N 2015/0846; G01N 21/01; G01N 21/211; G01N 21/85; G01N 2203/0094; G01N 2203/024; G01N 2203/0623; G01N 2203/0688; G01N 2291/0289; G01N 2291/101; G01N 23/00; G01N 2333/43552; G01N 2400/00; G01N 25/02; G01N 27/221; G01N 3/02; G01N 31/22; G01N 33/025; G01N 33/222; G01N 33/26; G01N 33/492; G01N 33/5085; G01N 33/84; G01N 1/04; G01N 1/2202; G01N 1/2205; G01N 1/4077; G01N 15/042; G01N 15/0618; G01N 15/0806; G01N 15/082; G01N 15/0886; G01N 15/1031; G01N 17/02; G01N 2001/021; G01N 2015/0288; G01N 2015/086; G01N 2021/3595; G01N 2021/8592; G01N 2030/025; G01N 2033/1873; G01N 2035/00881; G01N 21/21; G01N 21/23; G01N 21/33; G01N 21/3559; G01N 21/643; G01N 21/80; G01N 21/8507; G01N 21/88; G01N 21/91; G01N 21/93; G01N 22/04; G01N 2203/0017; G01N 2203/0033; G01N 2203/0051; G01N 2203/0658; G01N 2291/014; G01N 2291/02854; G01N 2291/02863; G01N 2291/02872; G01N 2291/106; G01N 23/223; G01N 24/08; G01N 25/14; G01N 25/72; G01N 27/22; G01N 27/223; G01N 27/44773; G01N 29/02; G01N 29/222; G01N 29/28; G01N 29/348; G01N 29/4472; G01N 29/46; G01N 3/12; G01N 3/20; G01N 3/24; G01N 3/30; G01N 3/36; G01N 3/58; G01N 3/60; G01N 30/00; G01N 33/0016; G01N 33/2823; G01N 33/2888; G01N 33/48; G01N 33/483; G01N 33/48792; G01N 33/582; G01N 33/66; G01N 33/6812; G01N 35/00; G01N 35/00871; G01N 5/025; G01N 5/045; G01N 9/24; G01N 1/08; G01N 1/30; G01N 1/31; G01N 11/16; G01N 15/00; G01N 15/1404; G01N 17/006; G01N 2001/2866; G01N 2011/0046; G01N 2015/0092; G01N 2015/0833; G01N 2015/1486; G01N 2021/152; G01N 2021/6421; G01N 2021/651; G01N 2021/7759; G01N 2021/7786; G01N 2021/8521; G01N 2021/8528; G01N 2030/8836; G01N 2033/008; G01N 2035/00108; G01N 21/05; G01N 21/6428; G01N 21/77; G01N 21/8986; G01N 2201/084; G01N 2203/0005; G01N 2203/0016; G01N 2203/0073; G01N 2203/0089; G01N 2203/0272; G01N 2203/0278; G01N 2203/0286; G01N 2203/0405; G01N 2203/0482; G01N 2291/0231; G01N 2291/0237; G01N 25/12; G01N 27/07; G01N 27/62; G01N 27/622; G01N 29/14; G01N 29/22; G01N 3/062; G01N 3/165; G01N 3/48; G01N 30/89; G01N 33/08; G01N 33/1826; G01N 33/2025; G01N 33/2028; G01N 33/2841; G01N 33/2894; G01N 33/343; G01N 33/487; G01N 33/48707; G01N 33/48757; G01N 33/48778; G01N 33/542; G01N 33/54353; G01N 33/5438; G01N 35/028; G01N 35/08; G01N 9/12; G01N 1/10; G01N 1/12; G01N 1/2211; G01N 1/2214; G01N 1/2226; G01N 1/24; G01N 1/26; G01N 1/2813; G01N 1/32; G01N 1/4022; G01N 11/142; G01N 15/0211; G01N 15/0255; G01N 15/06; G01N 15/0606; G01N 15/075; G01N 15/10; G01N 15/1433; G01N 15/1459; G01N 15/147; G01N 17/046; G01N 19/06; G01N 19/08; G01N 2001/025; G01N 2001/028; G01N 2001/1006; G01N 2001/1018; G01N 2001/2014; G01N 2001/2021; G01N 2001/2071; G01N 2001/366; G01N 2001/4066; G01N 2009/024; G01N 2009/026; G01N 33/4833; G01N 33/48721; G01N 33/48728; G01N 33/49; G01N 33/493; G01N 33/5076; G01N 33/5079; G01N 33/5091; G01N 33/5097; G01N 33/54373; G01N 35/00069; G01N 35/02; G01N 35/04; G01N 35/085; G01N 35/1095; G01N 35/1097; G01N 9/08; G01N 1/125; G01N 1/22; G01N 1/2208; G01N 1/36; G01N 1/4044; G01N 1/4055; G01N 11/08; G01N 17/008; G01N 2001/2028; G01N 2001/317; G01N 2001/383; G01N 2001/4016; G01N 2013/0208; G01N 2015/019; G01N 2021/0346; G01N 2021/8427; G01N 2030/123; G01N 2030/623; G01N 2033/0096; G01N 2033/243; G01N 21/17; G01N 21/27; G01N 21/41; G01N 21/49; G01N 21/553; G01N 21/554; G01N 21/64; G01N 21/658; G01N 21/84; G01N 21/9508; G01N 2201/0221; G01N 2201/0622; G01N 2203/0037; G01N 2203/0048; G01N 2203/0066; G01N 2203/0274; G01N 2203/028; G01N 2203/0447; G01N 2223/0745; G01N 2291/015; G01N 2291/0256; G01N 2291/0258; G01N 2291/02881; G01N 2291/0427; G01N 2291/105; G01N 2291/2634; G01N 2291/2697; G01N 2291/2698; G01N 23/222; G01N 25/54; G01N 2500/10; G01N 27/002; G01N 27/283; G01N 27/3275; G01N 27/4143; G01N 27/4145; G01N 27/4148; G01N 27/60; G01N 27/64; G01N 29/022; G01N 29/225; G01N 29/2493; G01N 29/265; G01N 29/27; G01N 29/4436; G01N 3/62; G01N 30/0005; G01N 30/20; G01N 30/463; G01N 30/6052; G01N 30/6078; G01N 30/6095; G01N 30/8658; G01N 31/226; G01N 33/2045; G01N 33/207; G01N 33/5005; G01N 33/5008; G01N 33/53; G01N 33/552; G01N 35/0098; G01N 7/16

USPC .......................................................... 73/866
See application file for complete search history.

(56) References Cited

U.S. PATENT DOCUMENTS

| | | |
|---|---|---|
| 8,065,929 B2 | 11/2011 | Yakimoski et al. |
| 8,631,687 B2 | 1/2014 | Patten et al. |
| 8,739,609 B2 | 6/2014 | Lukay et al. |
| 8,844,368 B2 | 9/2014 | Peecock et al. |
| 8,939,041 B2 * | 1/2015 | Vodnick ................. G01Q 40/00 |
| | | 33/1 BB |
| 9,316,569 B2 | 4/2016 | Oh et al. |
| 9,476,816 B2 | 10/2016 | Schmitz et al. |
| 9,581,437 B2 * | 2/2017 | Smythe .............. G01B 9/02038 |
| 9,829,417 B2 | 11/2017 | Schmitz et al. |
| 10,512,911 B1 | 12/2019 | Beckett et al. |
| 12,000,802 B2 | 6/2024 | Asif et al. |
| 2011/0252874 A1 | 10/2011 | Patten et al. |
| 2012/0072133 A1 | 3/2012 | Norwood et al. |
| 2013/0152706 A1 | 6/2013 | Nam et al. |
| 2013/0163634 A1 | 6/2013 | Smith et al. |
| 2015/0185117 A1 | 7/2015 | Schmitz et al. |
| 2020/0284707 A1 | 9/2020 | Asif et al. |

OTHER PUBLICATIONS

"Response to Communication Pursuant Article 94(3)," for European Patent Application No. 18876275.1 filed Feb. 6, 2025 (17 pages).
Rabe, Rodolfo "Compact test platform for in-situ indentation and scratching inside a scanning electron microscope (SEM)," Thèse No. 3593 (2006), École Polytechnique Fédérale de Lausanne, Aug. 18, 2006 (Aug. 18, 2006), XP055753743, Retrieved from the Internet: URL: https://infoscience.epfl.ch/record/86070/files/EPFL_TH3593.pdf?version=1 [retrieved on Nov. 24, 2020] (184 pages) (1 of 2—92 pgs) (2 of 2—92pgs).
Wheeler, J.M., et al."Elevated temperature, nano-mechanical testing in the scanning electron microscope," Review of Scientific Instruments, American Institute of Physics, 2 Huntington Quadrangle, Melville, NY 11747, vol. 84, No. 4, Apr. 3, 2013 (Apr. 3, 2013), pp. 045103-1 to 045103-15, XP012174758, ISSN: 0034-6748, DOI: 10.1063/1.4795829 [retrieved on Apr. 3, 2013] (15 pages).
"Notice of Allowance," for U.S. Appl. No. 16/763,319 mailed Feb. 2, 2024 (9 pages).
"Communication pursuant to Article 94(3) EPC," for European Patent Application No. 18876275.1 mailed Jul. 24, 2024 (8 pages).
"Response to Communication Pursuant Article 94(3)," For European Patent Application No. 18876275.1 filed Sep. 24, 2024 (20 pages).
"Communication pursuant to Article 94(3) EPC," for European Patent Application No. 18876275.1 mailed Oct. 9, 2024 (8 pages).

* cited by examiner

100

118

106    110    104  116

102

114

108

112

101

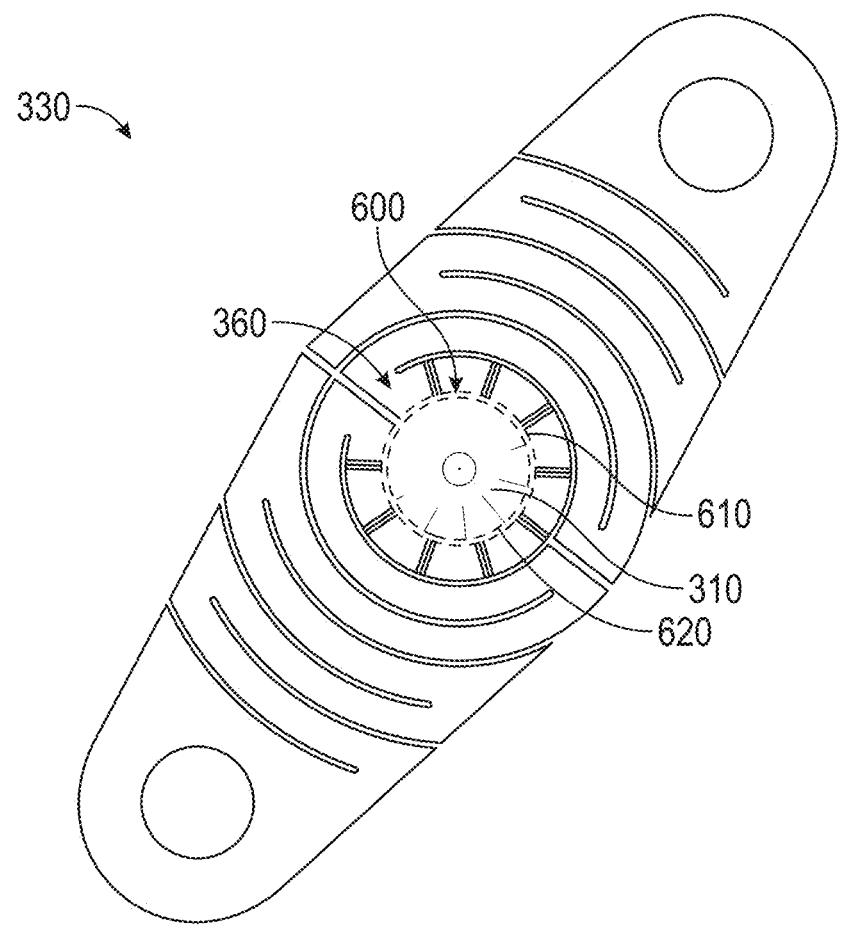
FIG. 6
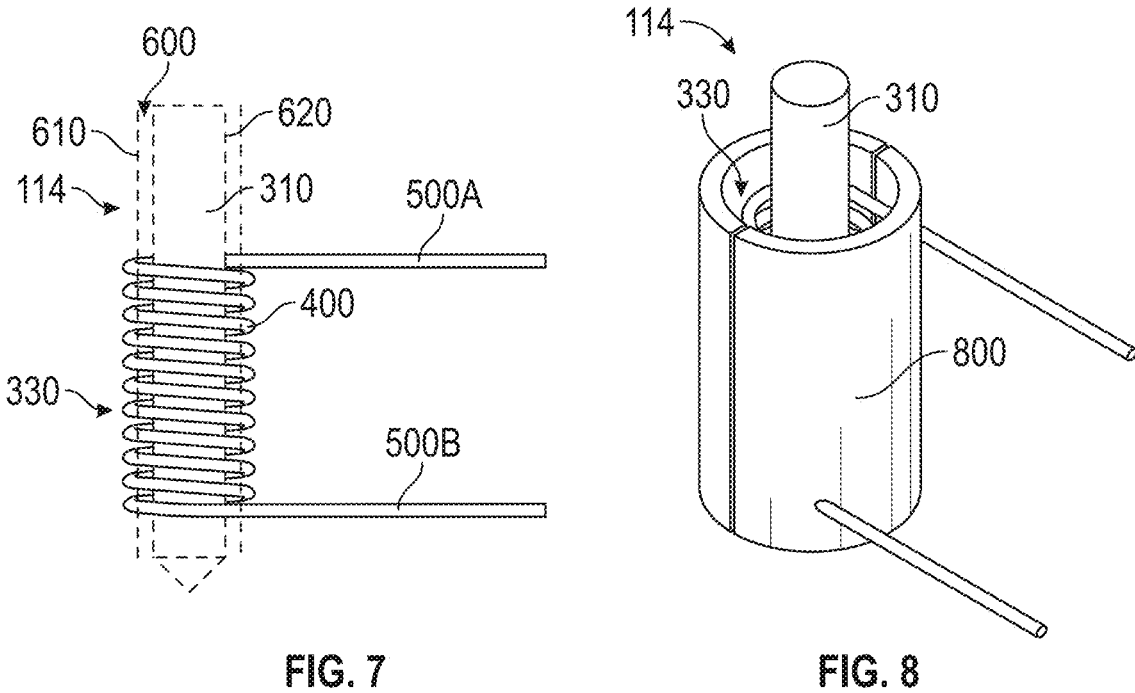
FIG. 7         FIG. 8

Figure 9:
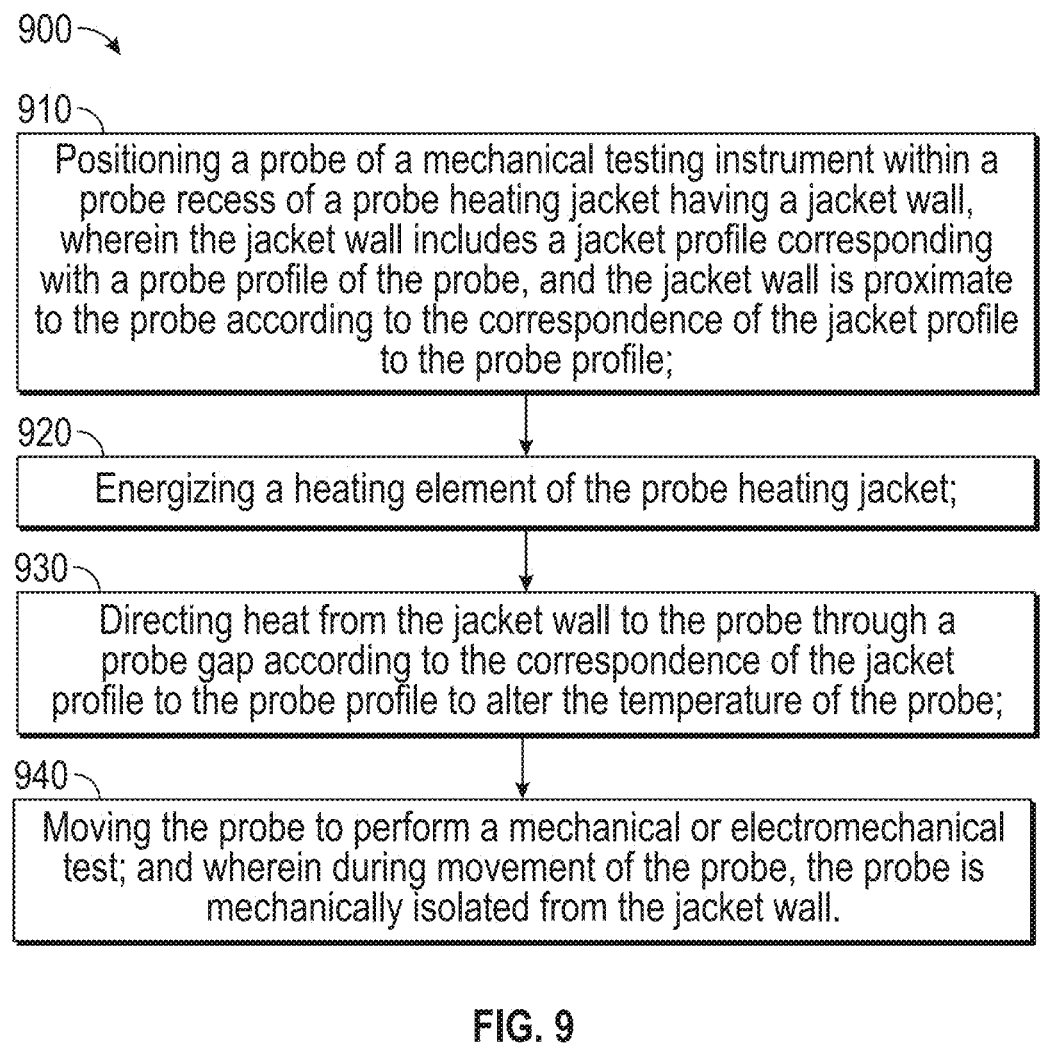

900 —

910 —

> Positioning a probe of a mechanical testing instrument within a probe recess of a probe heating jacket having a jacket wall, wherein the jacket wall includes a jacket profile corresponding with a probe profile of the probe, and the jacket wall is proximate to the probe according to the correspondence of the jacket profile to the probe profile;

920 —

> Energizing a heating element of the probe heating jacket;

930 —

> Directing heat from the jacket wall to the probe through a probe gap according to the correspondence of the jacket profile to the probe profile to alter the temperature of the probe;

940 —

> Moving the probe to perform a mechanical or electromechanical test; and wherein during movement of the probe, the probe is mechanically isolated from the jacket wall.

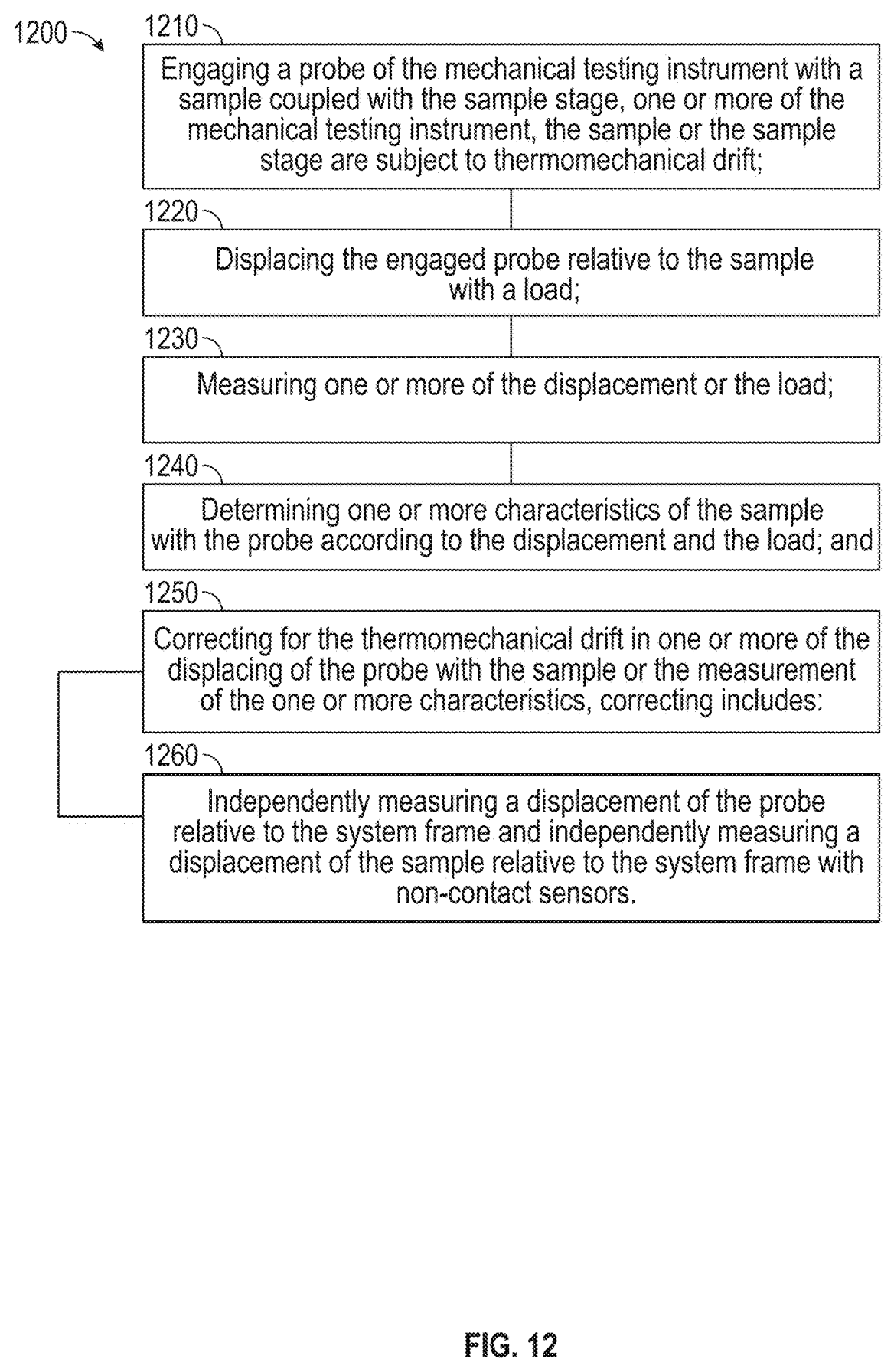

Engaging a probe of the mechanical testing instrument with a sample coupled with the sample stage, one or more of the mechanical testing instrument, the sample or the sample stage are subject to thermomechanical drift;

1220

Displacing the engaged probe relative to the sample with a load;

1230

Measuring one or more of the displacement or the load;

1240

Determining one or more characteristics of the sample with the probe according to the displacement and the load; and

1250

Correcting for the thermomechanical drift in one or more of the displacing of the probe with the sample or the measurement of the one or more characteristics, correcting includes:

1260

Independently measuring a displacement of the probe relative to the system frame and independently measuring a displacement of the sample relative to the system frame with non-contact sensors.

FIG. 12

ENVIRONMENTAL CONDITIONING MECHANICAL TEST SYSTEM

CLAIM OF PRIORITY

This application is a Continuation of U.S. application Ser. No. 16/763,319, filed May 12, 2020, which is a U.S. National Stage Application under 35 U.S.C. 371 of International Patent Application No. PT/US2018/060845, filed Nov. 13, 2018, which claims the benefit of priority of U.S. Provisional Patent Application Ser. No. 62/585,516, filed Nov. 13, 2017, the disclosures of which are incorporated herein by reference.

STATEMENT REGARDING FEDERALLY SPONSORED RESEARCH OR DEVELOPMENT

This invention was made with government support under DE-SC0013218 awarded by the U.S. Department of Energy. The government has certain rights in the invention.

COPYRIGHT NOTICE

BACKGROUND

Materials (e.g., metals, polymers, composites, or the like) include a plurality of mechanical and electromechanical properties (e.g., Young's Modulus, hardness, ductility, resistance, capacitance, or the like). One or more instruments are used to test the mechanical and electromechanical properties of the materials. In some examples, the mechanical and electromechanical properties of the materials in an environment vary with the characteristics of the environment (e.g., temperature, humidity, or fluid composition).

SUMMARY

A mechanical testing instrument (e.g., a probe having a probe tip) is included in a mechanical testing system, and the system tests the mechanical properties of a material sample by, for instance indenting, pulling, or scratching the sample. In some examples, the mechanical testing instrument is heated, for instance the mechanical instrument is heated to substantially equal a temperature of the sample of material. By heating the probe to a temperature equal to (e.g., including approaching) the temperature of the sample heat transfer between the sample and the mechanical testing instrument is minimized. Accordingly, upon engagement between the sample and the probe (e.g., by pulling, scratching, or indenting the sample of material) the precision and accuracy of the test performed by the mechanical testing instrument are improved.

The present inventors have recognized, among other things, that a problem to be solved can include altering the temperature of the mechanical testing instrument without affecting the mechanical or electromechanical properties of the mechanical testing instrument including the shape and size of the instrument or causing it to move (e.g., through expansion or contraction, thermomechanical drift or the like). Additionally, the present inventors have recognized, among other things, that a problem to be solved can include localizing heat transfer proximate to the mechanical testing instrument. Further, the present inventors have recognized, among other things, that a problem to be solved can include reducing the stress and strain applied to a heating element that is utilized to alter the temperature of the mechanical testing instrument.

The present subject matter can help provide a solution to this problem, such as by providing a heating element that is mechanically isolated from the mechanical testing instrument. For instance, and in some examples, a portion of the heating element is in close proximity to the mechanical testing instrument and surrounds the instrument to allow for heat transfer from multiple directions relative to the instrument while at the same time enclosing the instrument and minimizing escape of the transferred heat. Additionally, the heating element is separated from the mechanical testing instrument by a gap (e.g., a space, a distance, a void, a cavity, or the like). Positioning the heating element in close proximity to the mechanical testing instrument (e.g., the tip of the probe positioned at a distal end of the probe) localizes heat transfer to the mechanical testing instrument. Accordingly, heat transfer to other portions of mechanical testing system is minimized, and the effects of heating the other portions of the system are thereby reduced.

In contrast to heating the mechanical testing instrument with a mechanically isolated heating element, in other example a heating element is directly coupled to a proximal end of the mechanical testing instrument (e.g., a base of the probe). Heat generated by the heating element is conducted through the mechanical testing instrument toward the distal end of the mechanical testing instrument where the mechanical testing instrument engages with the sample. In some examples, because the heating element is directly coupled with the mechanical testing instrument, the heating of the mechanical testing instrument affects the mechanical response of the mechanical testing instrument (adds mass to the instrument). Alternatively, or in addition, the heating affects a transducer coupled with the instrument that measures displacement (and optionally drives) the mechanical testing instrument or a force applied to the mechanical testing instrument. Mechanically isolating the heating element from the mechanical testing instrument as described herein localizes the heating of the mechanical testing instrument to the probe (e.g., the component that will engage with the sample) while minimizing distributed heating of other portions of the instrument and the associated drawbacks. Accordingly, the precision and accuracy of the tests conducted by the mechanical testing system are enhanced.

Additionally, mechanically isolating the heating element from the mechanical testing instrument reduces stress and strain applied to a heating element. For instance, in some examples the heating element is directly coupled to the mechanical testing instrument, and the mechanical testing instrument is engaged with the sample to conduct a test of the mechanical or electromechanical properties. In one example, the mechanical testing system applies a force to the mechanical testing instrument (e.g., to indent the sample, pull the sample, or scratch the sample). Because the heating element is coupled to the mechanical testing instrument, such as a movable probe, the applied force is also applied to the heating element. In some examples, the application of force to the heating element reduces the lifespan or reliability of the heating element, and increases maintenance required for the heating element (e.g., replacement of the heating element). In other examples, the additional mass of the heating element decreases the mechanical performance (movement, fidelity of signal to specified movement or force, or the like) and sensitivity of the instrument. As described herein, by mechanically isolating the heating element from the mechanical testing instrument, the effect of the heating element mass on the mechanical testing instrument movement and sensing are minimized. Accordingly, one or more of performance, operational lifespan or reliability of both of the heating element and the mechanical testing instrument are enhanced.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 is a top view of the heating jacket of FIG. 4 with a probe received in the heating jacket of FIG. 4.

FIG. 7 is a side view of a mechanical testing instrument.

FIG. 8 is a perspective view of the mechanical testing instrument of FIG. 8.

FIG. 9 shows one example of a method for testing the mechanical properties of a material.

FIG. 12 shows one example of a method for correcting thermomechanical drift with a mechanical testing assembly.

DETAILED DESCRIPTION

Figure 1:
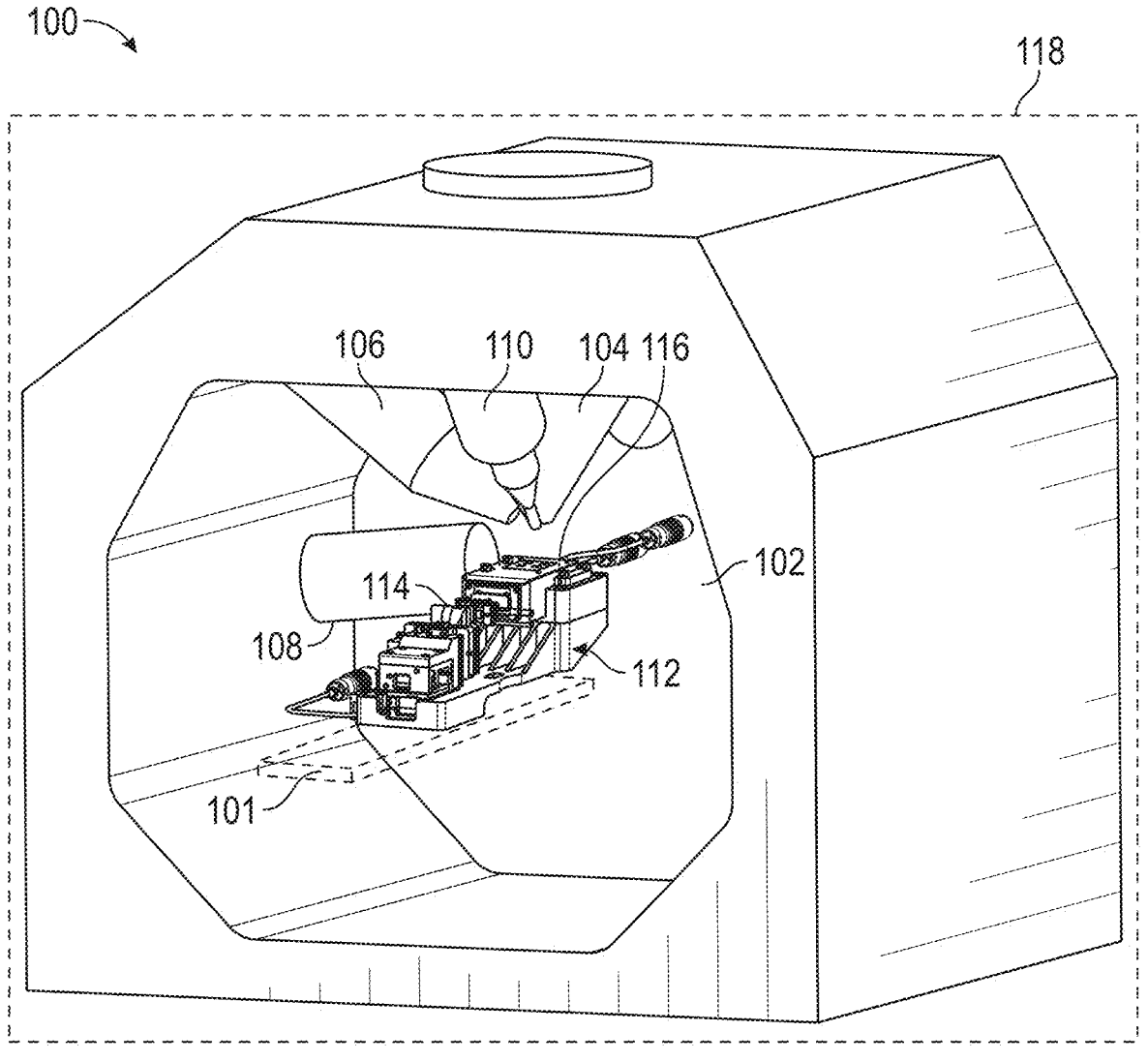
FIG. 1 is an isometric cutaway view of one example of a multi-instrument assembly including a multiple degree of freedom sample stage.

FIG. 1 shows a partial cutaway view of an example multi-instrument assembly 100. As shown, the multi-instrument assembly 100 includes an instrument chamber 102 surrounding a testing assembly 112 and a plurality of instruments (e.g., a microscope) including first, second, third, and fourth instruments 104, 106, 108, 110. As shown, each of the first through fourth instruments 104-110 is clustered around an area adjacent to the testing assembly 112. For instance, the first through fourth instruments 104-110 are arranged and include instrument axis and focal points or working distances (e.g., working regions) defining or within a localized coincidence region near the testing assembly 112, for instance, adjacent to a multiple degree of freedom sample stage 116. As will be described in further detail below, the assembly 100 includes a heater that alters the temperature of one or more components of the assembly 100. Additionally, the assembly 100 includes one or more systems to isolate and compensate for thermomechanical drift in one or more components of the assembly 100. For instance, the position of one or more components of the assembly 100 may vary relative to other components according to changes in temperature of the components (e.g., small-scale movements at the micrometer or nanometer level). Further, the multiple degree of freedom sample stage 116, a component of the testing assembly 112, is configured to orient a sample (e.g., the sample 300 shown in FIG. 3) on a sample stage surface (e.g., the sample stage surface 208 shown in FIGS. 2 and 3) into a plurality of orientations relative to two or more of the instruments of the first through fourth instruments 104-110.

As shown in FIG. 1, the testing assembly 112 is positioned within the instrument chamber 102, as previously described herein. As shown, the testing assembly 112 includes a mechanical testing instrument 114 such as an indenter, a scratch (laterally moving) mechanical testing instrument, tensile testing instrument or the like. The mechanical testing instrument 114 is configured to interact with a sample present on a sample surface stage of a sample stage, such as a multiple degree of freedom sample stage 116. For instance, the multiple degree of freedom sample stage 116 is configured to position a sample of a material for interaction with the mechanical testing instrument 114 while at the same time allowing for observation and further manipulation by one or more of the first through fourth instruments, 104-110.

In the example including the multi-instrument assembly 100, the assembly includes one or more instruments. For example one such instrument is a microscope instrument such as a scanning electron microscope including, for instance, a first instrument 104 such as an electron gun and a second instrument 108 such as an electron back scatter detector. In another option, the multi-instrument assembly 100 includes a third instrument 110 such as a secondary electron back scatter detector and a fourth instrument 106 such as a focused ion beam gun. In one example, the fourth instrument 106 is a tool configured to further process the sample positioned on the sample stage surface. For instance, the fourth instrument 106, in one example a focused ion beam gun, is configured to remove portions of the sample and expose previously unavailable portions of the sample for further study and interaction with the mechanical testing instrument 114 and one or more of the first through third instruments 104-108.

The assembly optionally includes an environmental chamber 118 configured to control one or more environmental characteristics including, but not limited to, pressure, temperature, atmospheric composition, humidity or the like. The example sub-systems for the environmental conditioning system include, but are not limited to, a vacuum chamber (e.g., a pressure chamber configured for one or more of negative, ambient or high pressure testing), cryogenic cooling system, humidity system, atmospheric composition and high temperature systems. In an example system 100 including the environment chamber 118, the chamber is included as part of the instrument enclosure (e.g., the enclosure is a pressure vessel), allowing pressure variations from 10-6 Torr to 1000 Torr. The transducer, probe, optical imaging system, and stage (including one or more degrees of freedom) fit within the pressure vessel (the instrument enclosure).

The other various environmental subsystems that control one or more other environmental characteristics, such as temperature and humidity, are optionally mounted to the stage (e.g., the sample stage 116) and fit within the pressure vessel. These systems are localized to a zone proximate to the sample and the probe. For instance, these systems are included in a housing that surrounds the sample and the probe and accordingly affect a smaller volume of space relative to the remainder of the instrument enclosure. This minimizes the energy input (e.g., for heating), approach time to reach specified environmental characteristic values, and system requirements, while also minimizing characteristics that may be adverse to measurement (such as drift) to enhance testing stability.

Figure 2:
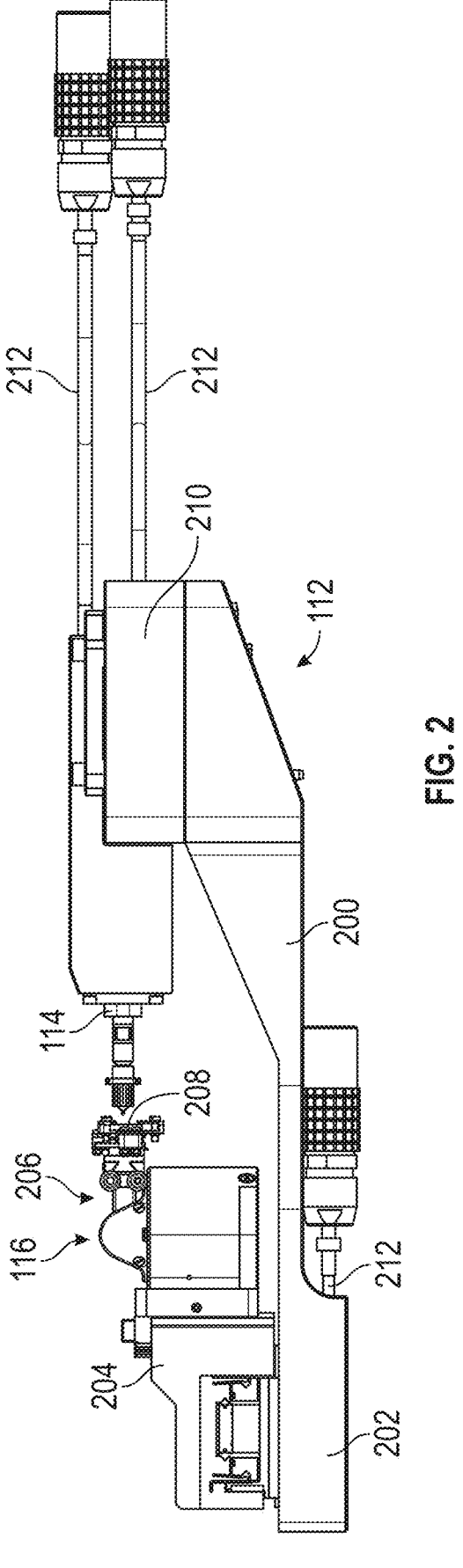
FIG. 2 is a perspective view of a testing assembly that includes the multiple degree of freedom sample stage shown in FIG. 1.

FIG. 2 shows one example of the testing assembly 112 previously shown in FIG. 1. As previously described, the testing assembly 112 includes a testing instrument, for instance a mechanical testing instrument 114. The testing assembly 112 includes a stage configured to support and present a sample for testing with the instrument 114. For instance, in the example shown in FIG. 2, the stage includes a multiple degree freedom sample stage 116.

The testing assembly 112 includes a testing assembly platform 200 sized and shaped to receive and mount each of the mechanical testing instrument 114 and the stage, in this example, the multiple degree of freedom sample stage 116. The testing assembly platform 200 further includes an assembly mount 202. The assembly mount 202 in one example is configured for positioning with and engagement to a mounting stage 101 of the multi-instrument assembly 100 (see FIG. 1). In a system including the instruments 104-110 the assembly mount 202 allows for the actuation of the testing assembly 112 relative to the instruments 104-110. Further, the multiple degree of freedom sample stage 116 (when included) provides additional orientation and positioning ability for a sample positioned on the sample stage surface of the multiple degree of freedom sample stage 116.

Referring again to FIG. 2, the multiple degree of freedom sample stage 116 includes, in the example shown, a linear stage assembly 204. In one example, the linear stage assembly includes X, Y, and Z linear stages configured to position the sample stage surface 208 along one or more of the linear axes. Additionally, the multiple degree of freedom sample stage 116 optionally includes a rotation and tilt stage assembly 206 coupled with the linear stage assembly 204. In one example, the rotation and tilt stage assembly 206 is coupled in series with the linear stage assembly 204. In another example, one or more of the rotation and tilt stages is interposed between one or more of the linear stages of the linear stage assembly 204.

In yet another example, the mechanical testing instrument 114 is coupled with the testing assembly platform 200 with a mechanical testing instrument linear stage 210 (e.g., a stage configured to move the instrument relatively along an axis, such as the X axis) interposed therebetween. In one example, the mechanical testing instrument linear stage 210 includes one or more linear stages (one or more of X, Y or Z linear stages) configured to move the mechanical testing instrument 114 relative to the sample stage surface 208 as well as one or more of the first through fourth instruments 104-110.

As further shown in FIG. 2, actuation and sensing cabling 212 extends to one or more portions of the testing assembly 112, for instance to each of the linear stages of the linear stage assembly 204 as well as each of the rotation and tilt stages of the rotation and tilt stage assembly 206. Additionally, in another example actuation and sensing cabling 212 is provided for the mechanical testing instrument 114, as well as the mechanical testing instrument linear stage 210. The actuation and sensing cabling 212 facilitates the actuation of each of the one or more stages, the mechanical testing instrument or the like. In another example, the actuation and sensing cabling 212 is coupled with encoders provided with each of the stages of the linear stage assembly 204, the rotation and tilt stage assembly 206, and the mechanical testing instrument linear stage 210 to facilitate the accurate actuation and positioning and orientation measurement of the instruments and sample stage surface 208 as described herein.

Further, the multiple degree of freedom sample stage 116 is configured to position the sample stage surface 208 within a coincidence region of the instruments 110 (e.g., where the focal points of the one or more instruments 104-110 are aligned or coincident) without undesired collision with any of the instruments 104-110 and the mechanical testing instrument 114. Optionally, the mechanical testing instrument 114 on the mechanical testing instrument linear stage 210 is configured to cooperate with movement of the sample stage (e.g., the multiple degree of freedom sample stage 116) to ensure mechanical testing interaction is possible with the sample stage surface 208 in a variety of orientations. In some examples, the movement of the mechanical testing instrument 114 and the sample stage cooperate to align the sample with one or more the instruments 104-110. For instance, a sample is aligned with the mechanical testing instrument 114 while the sample is also oriented relative to one or more of the instruments 104-110.

Figure 3:
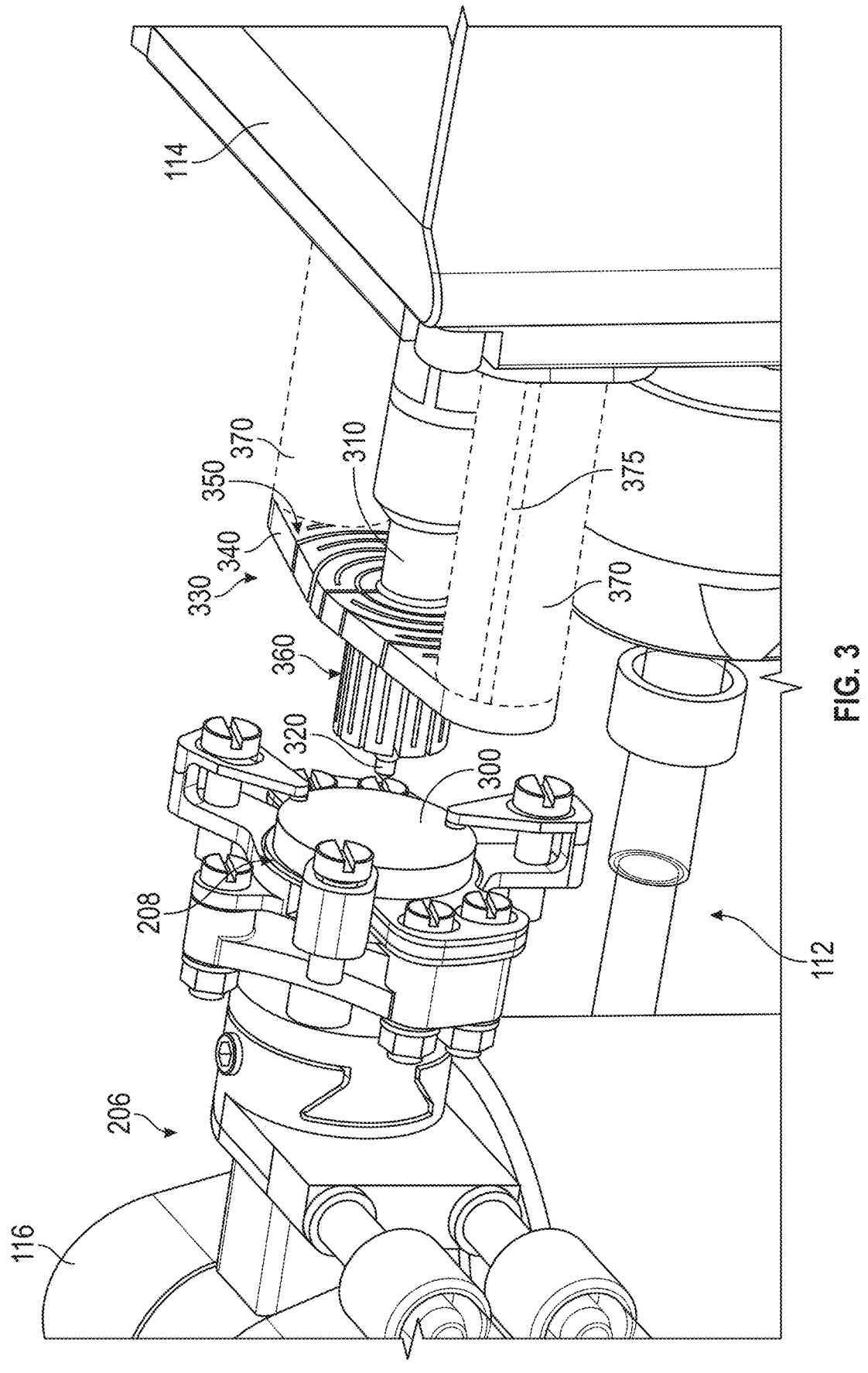
FIG. 3 is a detailed perspective view of the testing assembly shown in FIG. 2.

FIG. 3 is a detailed perspective view of the testing assembly shown in FIG. 2. The testing assembly 112 includes the mechanical testing instrument 114. The instrument 114 is configured to engage with and test a sample 300 coupled with the sample stage surface 208 to test one or more mechanical or electromechanical properties of the sample 300. In some examples, the sample 300 includes one or more of metal, alloy, polymer, ceramic, glass, composite, semiconductor, biological samples or the like.

The mechanical testing instrument 114 includes a probe 310 having a probe tip 320. The probe 310 selectively engages with (e.g., indents, scratches, or the like) the sample 300 to measure one or more of force, deformation (indentation depth) or the like, for instance to assess one or more properties (e.g., hardness, Young's modulus, or the like) of the sample 300. In another example, the instrument 114 includes a clamping member to selectively couple with the sample 300 and the instrument 114 applies a tensile force to the sample 300 to test one or more properties (e.g., tensile strength, Poisson's ratio, or the like) of the sample 300.

As further shown in FIG. 3, the testing assembly 112 includes a heating jacket 330 configured to heat one or more portions of the mechanical testing instrument 114. In one example, the heating jacket 330 heats the probe 310 including at least the probe tip 320. In another example, the heating jacket 330 optionally heats a clamping member (e.g., one or more jaws of the clamping member) provided with the probe 310, for instance used in tensile testing. As described in greater detail herein, the heating jacket 330 is coupled to the mechanical testing assembly 114 with one or more jacket support struts 370. In the example shown in FIG. 3, the heating jacket 330 includes a jacket base 340 and a support interface 350. The one or more jacket support struts 370 are coupled with the fastening interface 350 and couple the heating jacket 330 with the mechanical testing instrument 114. Additionally, the jacket support struts 370 optionally include one or more conductive members 375, and the one or more conductive members are in electrical communication with the heating jacket 330 to supply an electrical signal to the heating jacket 330 and thereby energize the heating jacket 330 to generate heat.

Heating the one or more portions of the testing assembly 112 (e.g., the probe tip 320) minimizes heat transfer between components of the testing assembly 112. Accordingly, the accuracy of tests performed by the testing assembly 112 is improved. In an example, the sample 300 is coupled with the sample stage 116 (e.g., the sample stage surface 208 shown in FIG. 2). The temperature of the sample 300 is optionally altered, for instance with a heating coil positioned proximate the sample stage surface 208. In this example, when the sample 300 is heated, and the instrument 114 (e.g., the probe tip 320) interacts with the sample 300, heat transfers from the sample 300 to the mechanical testing instrument 114. In some examples, the heat transfer between the sample 300 and the instrument 114 affects the accuracy of the test results of the testing assembly 112. The heat transferred from the sample to the probe tip 320 (or inversely with a cooled sample) lowers the temperature of the sample 300. In some examples, mechanical or electromechanical properties of the sample 300 vary with the temperature of the sample 300. Accordingly, the accuracy of the results of the tests performed by the testing assembly 112 is affected by the heat transferred to or from (and subsequent temperature change of) the sample 300. Additionally, heat transferred to or from the probe (e.g., from the sample) changes the dimensions of the probe and accordingly introduces measurement error in either or both of force or displacement measurements because of expansion or contraction based on the heat transfer.

Referring again to FIG. 3, the heating jacket 330 minimizes heat transfer from the sample 300 to the mechanical testing instrument 114. For instance, the heating jacket 330 heats the instrument 114 prior to testing (and optionally during testing) to ensure the temperature of the instrument 114 (e.g., the probe tip 320) substantially corresponds with the temperature of the sample 300. Accordingly, heat transfer between the sample 300 and the instrument 114 is minimized, and the accuracy of the tests performed by the testing assembly 112 is enhanced.

As described in greater detail herein, the heating jacket 330 includes a heating element 360 and a jacket base 340. The heating element 360 extends from the jacket base 340. As described further herein, the heating element 360 is configured to receive the probe 310. Additionally, the heating element 360 is mechanically isolated from the probe 310 and the probe tip 320. For instance, the heating jacket 330 is coupled to the mechanical testing instrument 114, and the probe 310 is separately coupled to the mechanical testing instrument 114 without physical contact or engagement to the probe 310. The heating jacket 330 is configured to apply non-contact heat transfer between the jacket 330 and the probe 310.

Figure 4:
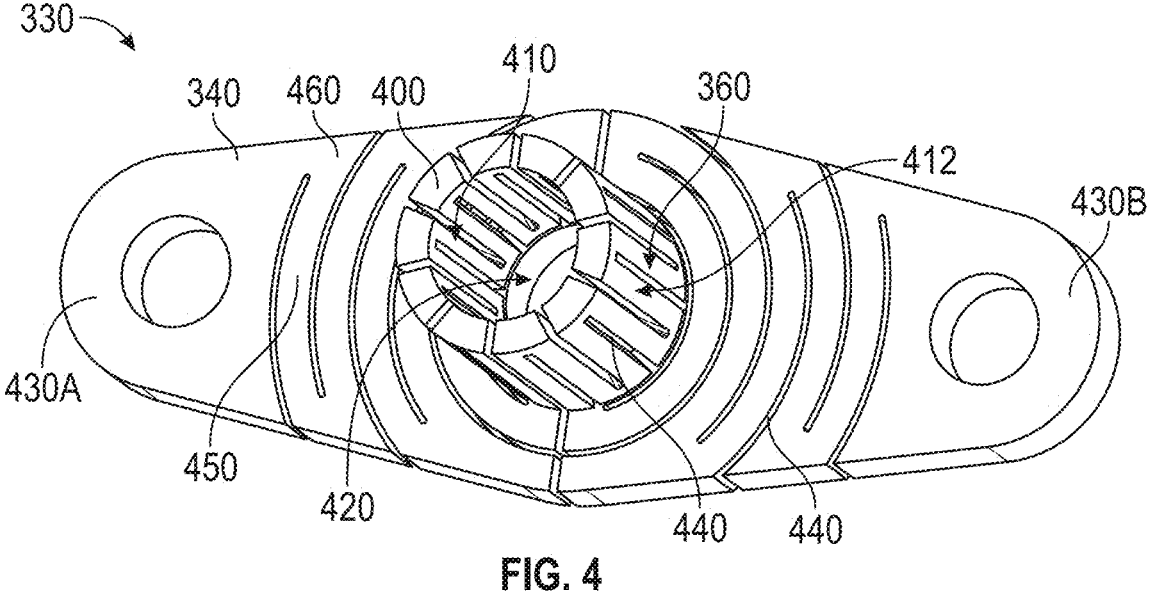
FIG. 4 is a perspective view of one example of a heating jacket.

FIG. 4 is a perspective view of one example of the heating jacket 330. The heating jacket 330 includes the heating element 360. As further shown in FIG. 4, the heating element 360 includes a jacket wall 400 having interior and exterior surfaces 410, 412. The interior surface 410 of the jacket wall 400 surrounds (e.g., encloses, circumscribes, partially encloses or circumscribes or the like) a probe recess 420 and receives the probe 310 therein. For example, the probe 310 is positioned in the probe recess 420 (e.g., as shown in FIG. 6). The probe recess 420 optionally extends through the jacket base 340, and facilitates the reception of the probe 310 by the heating jacket 330. As described herein, the jacket wall 400, for instance the interior surface 410, includes a jacket profile corresponding to a probe profile to facilitate a proximate but disengaged positioning of the jacket wall 400 relative to the probe 310 to enhance heat transfer of the probe while the probe 310 remains mechanically isolated.

In the example shown in FIG. 4, the jacket base 340 includes a first end 430A and a second end 430B. The one or more jacket support struts 370 are coupled to the first end 430A and the second end 430B and position the heating jacket 330 in close proximity to the probe 310 while maintaining mechanical isolation therebetween (e.g., with a probe gap). One or more conductive members 375 associated with the struts 370 deliver power between the first and second ends 430A, 430B for operation of the heating jacket 330. For instance, the conductive members 375 transmit electricity between the first and second ends 430A,B of the heating jacket 330.

The heating jacket 330 includes, but is not limited to molybdenum disilicide, platinum alloys or the like in a solid core that are optionally machined (e.g., by electrical discharge machining) to provide stress minimizing features to the heating jacket 330. For instance, a plurality of channels 440 are optionally included in the heating jacket 330 to circuitously route electricity from the first end 430A to the second end 430B and thereby resistively heat the heating jacket 330 along the jacket wall 400. Additionally, the plurality of channels 440 facilitate the tuning of the resistance (and thereby heating) of the heating jacket 340 through variation of the cross-sectional area at the various segments 450 and corners 460 of the jacket 330. Accordingly, the channels 440 facilitate the control of the heat generated by the heating element 360. Further, the cutouts 440 facilitate the expansion and contraction of the jacket wall 400 in a lateral manner relative to the probe recess 420 while minimizing radial expansion or contraction of the jacket wall 400 and corresponding engagement with the probe.

Figure 5:
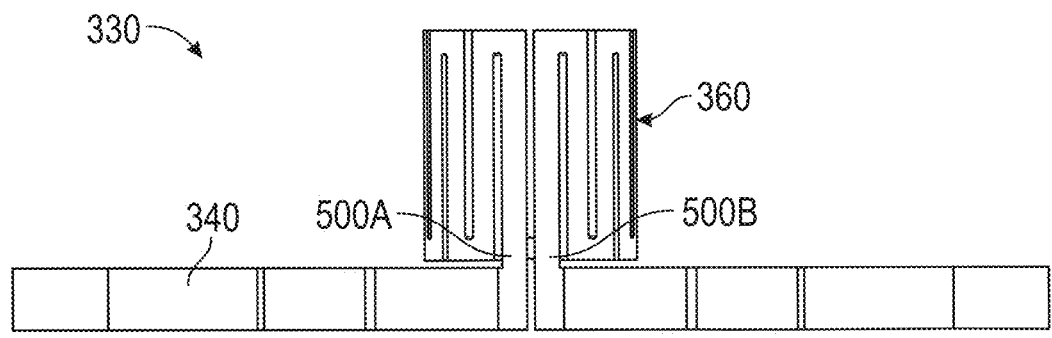
FIG. 5 is a side view of the heating jacket of FIG. 4.

FIG. 5 is a side view of the heating jacket of FIG. 4. The heating jacket 330 includes the jacket base 340 and the heating element 360. As previously described, the heating element 360 (including the jacket wall 400) is coupled to the jacket base 340 with a first leg 500A and a second leg 500B. The first leg 500A is in electrical communication with the second leg 500B through the heating element 360 including in this example the serpentine segments and corners of the jacket wall 400. Accordingly, an electrical signal transmitted through the first leg 500A is transmitted through the heating element 360 to the second leg 500B to initiate heating in the jacket wall 400.

FIG. 6 is a top view of the heating jacket of FIG. 4 with the probe 310 received in the heating jacket 330. As shown, the probe 310 is received in the probe recess 420 of the heating jacket 330. A probe gap 600 is provided between the probe 310 and the heating element 360 (e.g., between the jacket wall 400 and the probe 310). The jacket wall 400, such as the interior surface 410 of the jacket wall 400, includes a jacket profile 610 corresponding to a probe profile 620 of the probe 310. The corresponding profiles facilitate the reception of the probe 310, mechanical isolation of the probe 310, and at the same time ensure heat generated at the jacket wall 400 is immediately delivered across the intervening probe gap 600 to the probe 310. In this example, because the heating element 360 is mechanically isolated from the probe 310, the heating element 360 does not conduct heat to the probe 310. Instead, the heating element (e.g., the jacket wall 400) transfers heat to the probe 310 through one or more non-contact modes of heating, for example radiative or convective modes of heat transfer as well as inductive heating (described herein).

As described herein, the jacket wall 400 (shown in FIG. 4) includes the jacket profile 610. For instance, the jacket profile 610 is substantially circular or cylindrical and corresponds to one or more of the shape, contour or size of the interior surface of the jacket wall 400. Conversely, the probe 310 includes the probe profile 620. In the example provided in FIG. 6, the probe profile 620 corresponds to the jacket profile 610. For instance, the jacket profile 610 is substantially circular or cylindrical and includes one or more of a shape, contour or size approximating the probe profile 620. The correspondence between the jacket profile 610 and the probe profile 620 ensures the probe gap 600 is minimal therebetween while ensuring the probe 310 is mechanically isolated from the jacket wall 400. In one example, the jacket profile 610 includes dimensions that are slightly larger than the probe profile 620. Accordingly, the jacket 330 is sized and shaped to receive the probe 310 in the probe recess 420 (shown in FIG. 4). Similarly, the jacket profile is optionally aligned with (e.g., concentrically, axially, or the like) with the probe profile 620 to facilitate the reception of the probe 310 within the probe recess 420. Accordingly, the correspondence between the jacket profile 610 and the probe profile 620 ensures high fidelity of heat transfer (e.g., with minimal heat transfer loss) while also maintaining mechanical isolation of the jacket 330 from the probe 310.

Referring again to the example shown in FIG. 6, the heating element 360 (e.g., the inner surface 410 of the jacket wall 400) is in close proximity to the probe 310. Additionally, the heating element 360 surrounds the probe 310 including one or more of a continuous enclosing of the probe 310, continuous enclosing with breaks for the channels 440, continuous enclosing with gaps between discrete portions of the jacket wall 400 (e.g., gaps between posts, elements or the like). The positioning of the jacket wall 400 in close proximity to the probe 310 enhances heat transfer between the heating element 360 and the probe 310. Additionally, surrounding the probe 310 with the heating element 360 further enhances heat transfer by directing heat from multiple directions toward the probe 310 while at the same time using the heated jacket wall 400 to minimize escape of accumulated heat in the probe 310 (e.g., through gaps). For example, heat transfer is accomplished from multiple directions relative to the probe 310 (e.g., along perimeter of the probe 310 from the interior surface 410, shown in FIG. 4) while openings in the jacket wall 400 are optionally minimized to correspondingly minimize the escape of heat.

FIG. 7 is a side view of another example of a mechanical testing instrument 114. The mechanical testing instrument 114 includes the probe 310 and another example of the heating jacket 330. In this example, the heating jacket 330 is coiled around the probe 310 and is mechanically isolated from the probe 310. For instance, the probe 310 includes the probe profile 620, and the heating jacket 330 includes the jacket profile 610. The jacket profile 610 corresponds with the probe profile 620, and the jacket profile 610 and the probe profile 620 surround a probe gap 600. The jacket wall 400 is positioned in close proximity to the probe 310 and surrounds (e.g., coils around) the probe 310 to allow for heat transfer (or inductive heating) from multiple directions relative to the probe 310.

Electricity is transmitted to the first leg 500A and transmitted through the heating jacket 330 to the second leg 500B. In this example, the heating jacket 330 inductively heats the probe 310 to alter the temperature of the probe 310. For instance, the transmission of electricity through the heating jacket 330 generates a magnetic field, and the magnetic field correspondingly excites and thereby heats the probe 310. In this example, the heating jacket 330 is mechanically isolated from the probe 310, and the heat transfer is a non-contact mode of heat transfer (e.g., inductive heating).

In another example, the heating jacket 330 includes a passageway, and a fluid is pumped through the heating jacket 330 to heat or cool the probe 310. For instance, a chilled fluid (relative to the temperature of the probe 310) is pumped into the first leg 500A and through the heating jacket 330. The fluid flows through the heating jacket 330 and cools the probe 310 (e.g., through convection or thermal radiation), and the fluid exits the second leg 500B of the heating jacket 330, for instance for heating or cooling and is then recirculated through the jacket.

FIG. 8 is a perspective view of the mechanical testing instrument of FIG. 8. In this example, a shield 800 substantially surrounds the heating jacket 330 to enhance heat transfer to the probe 310. In one example, the shield 800 reflects infrared energy that is otherwise dissipated by the probe 310. In another example, the shield 800 directs the magnetic field generated by the heating jacket 330 to enhance the inductive heating of the probe 310. In yet another example, the shield 800 is positioned proximate the heating jacket 330 shown in FIG. 3-6 to insulate the probe 310 or to reflect infrared energy generated by the heating element 360 inwardly back toward the element 360 and toward the probe 310.

FIG. 9 shows one example of a method 900 for testing the mechanical properties of a material, including one or more of mechanical testing instrument 114, the probe 310, or the heating jacket 330 as described herein. In describing the method 900, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 900 include, but are not limited to, the corresponding numbered elements provided herein and other corresponding elements described herein (both numbered and unnumbered) as well as their equivalents.

At 910, a probe 310 of a mechanical testing instrument 114 is positioned within a probe recess 420 of a heating jacket 330 having a jacket wall 400. The jacket wall 400 includes a jacket profile 610 corresponding with a probe profile 620 of the probe 310. The jacket wall 400 is proximate to the probe 310 according to the correspondence of the jacket profile 610 to the probe profile 620.

At 920, a heating element 360 of the heating jacket 330 is energized. For example, an electrical signal (e.g., current or the like) is delivered to the heating jacket 330 to initiate one or more of resistive heating of the element 360, induction of the element or the like.

At 930, heat from the jacket wall 400 is directed toward the probe 310 and across a probe gap 600 according to the correspondence of the jacket profile 610 to the probe profile 620 to alter the temperature of the probe 310. In another example heating includes inductively heating the probe 310 across the probe gap 600 with the magnetic field generated with the jacket 330 (as shown in FIG. 7).

At 940, the method 900 includes moving the probe 310 to perform a mechanical or electromechanical test. In one example, moving the probe 310 includes one or more of translation, rotation or lateral scratching movement within the probe recess 420, and the jacket wall 400 mechanically isolates the probe 310 with each of the one or more movements. Accordingly, the probe 310 has one or more degrees of freedom relative to the heating jacket 330 (including, but not limited to reciprocating, rotating, or the like).

Several options for the method 900 follow. For instance, the probe 310 is engaged with the sample 300. In an example, engaging the probe 310 with the sample 300 includes applying a force to the probe 310 with the mechanical testing instrument 114.

Figure 10:
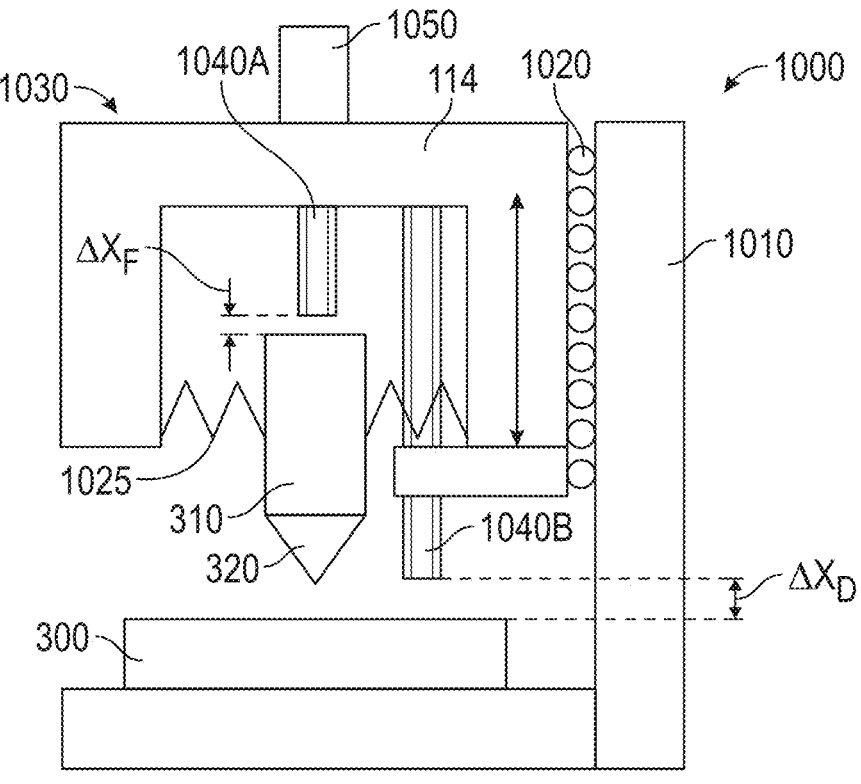
FIG. 10 is a schematic view of a system for correcting thermomechanical drift in a mechanical testing assembly.

FIG. 10 is a schematic view of a system 1000 for correcting thermomechanical drift in a mechanical testing assembly. The system 1000 includes a system frame 1010 and the mechanical testing instrument 114. In some examples, the system frame 1010 corresponds to the testing assembly platform 200 shown in FIG. 2. The system 1000 optionally includes an MTI (mechanical testing instrument) actuator 1020 that allows for actuation and positioning of the mechanical testing instrument 114 relative to the system frame 1010 (e.g., in one or more directions, for instance up or down relative to the system frame 1010). In some examples, the MTI actuator 1020 corresponds to the mechanical testing instrument linear stage 210 shown in FIG. 2. The mechanical testing instrument 114 includes a probe 310, and the probe 310 is actuated by a probe actuator 1025 (such as a capacitive transducer) to position the probe 310 relative to the instrument 114. In some examples, a sensor (e.g., a transducer) is included in the probe actuator to determine, for example, a load (e.g., force) applied to the probe 310 or the displacement of the probe 310. In another example, the probe actuator 1025 includes a transducer that applies one or more specified loads, displacements of the probe 310 and also measures one or more resulting loads, displacements or the like (e.g., actual resulting loads or displacements in contrast to the applied loads or displacements).

The system 1000 for correcting thermomechanical drift includes an interferometer system 1030. As shown in FIG. 10, the interferometer system 1030 is coupled with the mechanical testing instrument 114. In this example, the interferometer system 1030 includes a first interferometer 1040A and a second interferometer 1040B. The first interferometer 1040A is coupled between the probe 310 and a remainder of the mechanical testing instrument 114. The first interferometer 1040A determines a probe displacement $\Delta X_F$ of the probe 310 relative to the remainder of the mechanical testing instrument 114. The probe displacement $\Delta X_F$ corresponds to the movement of the probe and accordingly provides an accurate representative of the probe movement to measure actual indentation depth or other displacement based values of the probe relative to a sample and the remainder of the mechanical testing instrument.

In an example, the first interferometer 1040A splits a first coherent beam of light into a first component beam and a second component beam. The first coherent beam of light is produced by a light source, for instance a laser generator (e.g., the laser generator 1111 shown in FIG. 11). The first coherent beam of light is transmitted through a medium, for example an optical fiber (e.g., the optical fiber 1120) including a fiber end (e.g., a cleaved end 1125 of the optical fiber 1120, shown in FIG. 11). The first coherent beam of light reaches the fiber end, and is split into the first component beam and the second component beam forming an optical cavity. In some examples, the first component beam (e.g., a reference beam) is reflected back from the fiber end, and the second component beam (e.g., an active beam) escapes the optical fiber and is transmitted toward a target (e.g., the probe 310, or for example, a back side of the probe 310 opposite the probe tip 320). The second component beam is reflected off the target and back into the optical fiber. Optionally, the first component beam and the second component beam are combined (e.g., recombined) within the optical fiber, and in some examples the first component beam interferes with the second component beam into an interference signal.

An optical detector (e.g., the optical detector 1117 shown in FIG. 11) detects the interference signal. In some examples, the component beams or the coherent beam us modulated with one or more of wavelength modulation, phase modulation, or cavity modulation. The detected component beams (e.g., the interference signal) are processed (e.g., by the synchronous demodulator 1118 shown in FIG. 11) to determine the displacement between the target and the fiber end. In one example, the displacement is determined using fringe counting. Fringe counting includes observing (e.g., with the optical detector) an interference fringe pattern produced by the combined first component beam and the second component beam. In this example, because the combined first component beam and the second component beam are out of phase, interference (e.g., constructive interference or destructive interference) by the component beams produces a fringe pattern (e.g., a gradient of light and dark banding) when observed. The distance between fringes of the fringe pattern is known, for example the distance between light and dark bands of the fringe pattern corresponds to a wavelength of the first coherent light beam. The system 1000 analyzes the fringe pattern and accordingly determine the distance between the fiber end and the target. For instance, the system 1000 counts changes from light to dark banding to determine the change in distance of the target relative to the fiber end. Accordingly, the first interferometer 1040A allows for a determination of the probe displacement $\Delta X_F$ of the probe 310 relative to the remainder of the mechanical testing instrument 114. Additionally, the probe displacement corresponds in one example to an indentation depth of a tip of the probe 310 into a sample. As described herein, the probe displacement is, in another example, used in combination with displacement of the mechanical testing instrument 114 relative to the system frame 1010 to refine measurements of indentation depth to isolate and remove thermomechanical drift.

In another example, the displacement is determined using quadrature detection where the quadrature point is detected in the fringe pattern. For instance, the quadrature point (e.g., inflection point, or the midway point between constructive interference and destructive interference of the combined component beams) provides maximum sensitivity to changes in distance between the fiber end and the target.

The second interferometer 1040B is coupled between the mechanical testing instrument 114 and the system frame 1010. The second interferometer determines a sample displacement $\Delta X_D$ of the sample stage (e.g., the sample stage 116 shown in FIGS. 1-3) or the sample 300 relative to the mechanical testing instrument 114. For instance, the second interferometer 1040B splits a second coherent beam of light into a third component beam (e.g., the reference beam) and a fourth component beam (e.g., the active beam). Optionally, the third component beam and the fourth component beam are combined into an interference signal. The interference signal is detected and processed to determine the displacement between the second laser interferometer 1040B (e.g., a fiber end) and the sample stage or the sample 300. This facilitates precise and accurate measurement of the position (and movement) of the mechanical testing instrument 114 relative to the sample stage and the system frame 1010.

Referring again to FIG. 10, the system 1000 for correcting thermomechanical drift includes an isolation and measurement module 1050 in communication with the interferometer system 1030. The module 1050 optionally includes a processing unit (e.g., an ASIC, CPU, or the like) that processes data received from the interferometer system 1030. In an example, the module 1050 determines a difference between the probe displacement $\Delta X_F$ and the sample displacement $\Delta X_D$. The module 1050 facilitates the isolation of the mechanical testing instrument 114 from the thermomechanical drift of the system frame 1000 by using the determined difference between the probe displacement $\Delta X_F$ and the sample displacement $\Delta X_D$. For instance, the thermomechanical drift of the system frame 1000 affects the determination of the displacement of an indentation depth of the probe 114 relative to the sample 300. For example, the system 1000 will read a variable indentation depth or force over a period of time due to the thermomechanical drift of the system frame 1010 and corresponding fluctuations caused by expansion or contraction of the frame 1010. In the example shown in FIG. 10, because the first interferometer 1040A is coupled between the probe 310 and the remainder of the instrument 1040 the interferometer 1040A measures displacement of the probe 310 relative to the instrument 1040. Further, because the second interferometer 1040B is coupled between the instrument 114 and the sample 300 (or the sample stage) the second interferometer 1040B measures the displacement of the sample 300 relative to the mechanical testing instrument 1040. The difference between the probe displacement $\Delta X_F$ and the sample displacement $\Delta X_D$ corresponds to the actual displacement of the probe (e.g., indentation depth or the like) relative to the sample without inclusion of the thermomechanical drift of the system frame 1010. Stated another way, by coupling the interferometer system with the mechanical testing instrument 1040 and measuring the position of the probe 310 and the sample 300 the system frame 1010 and any thermomechanical drift of the frame 1010 are effectively isolated and removed from consideration. Accordingly, the thermomechanical drift of the system frame 1010 is isolated by and removed by the system 1000 to enhance the precision and accuracy of the determined indentation depth of the probe 140 relative to the sample 300.

In another example, the systems and methods described herein minimize (e.g., minimize or eliminate) thermomechanical drift in one or more of the mechanical testing instrument, sample stage or the like. As described herein, the probe 310 is optionally engaged with the sample 300 to determine one or more characteristics of the sample 300 according to a displacement of the probe 310 (indentation depth, tensile retraction or the like) and a load applied to the sample 300. The mechanical testing instrument 114, the sample 300, or the sample stage (e.g., the multiple degree of freedom sample stage 116) are subject to thermomechanical drift. The system 1000 optionally facilitates correction of thermomechanical drift in these components. In an example, the thermomechanical drift is corrected actively or passively. For instance, thermomechanical drift is actively corrected during the test at the interface of the probe 310 to the sample 300 (e.g., at engagement and testing). In another example, the thermomechanical drift experienced during measurements is passively isolated and removed after the test.

In an example, the thermomechanical drift is actively corrected by translational driving (e.g., repositioning or actuating) of one or more of the probe 310 or the sample 300 in a compensation (e.g., inverse) scheme relative to the thermomechanical drift that corresponds to a determined displacement. In an example, the probe 310 is translated (e.g., actuated) to counteract (e.g., cancel, minimize, counterbalance, or the like) the thermomechanical drift. For example, the sample 300 translates due to thermomechanical drift in the sample stage or the system frame 1000. The probe 310 is translationally driven to correct (e.g., chase, follow, cancel out, or the like) the drift of the sample 300. Accordingly, the system 1000 improves the accuracy of determining the one or more characteristics of the sample 300. In another example, the thermomechanical drift causes the load sensed by the sensor to fluctuate (e.g., the force between the probe 310 and the sample varies because the position of the sample 300 relative to the probe 310 changes with the thermomechanical drift). In this example, the thermomechanical drift is corrected by varying the load to compensate for the thermomechanical drift and accordingly the load is consistently applied to the probe 310 or the sample 300.

In yet another example, the thermomechanical drift is passively corrected by subtraction of detected thermomechanical drift from the measured displacement of the probe 310 or the determined one or more characteristics of the sample 300. For instance, the probe 310 is engaged with the sample 300 and displaced relative to the sample by applying a load to the probe 310. The displacement of the probe 310 is measured (e.g., with a sensor, for example a transducer). The determined thermomechanical drift is subtracted from displacement of the probe 310, and the accuracy of the measured displacement of the probe 310 is thereby improved. In another example, the fluctuation corresponding to thermomechanical drift is utilized to correct the measured load by subtracting the load fluctuations attributed to the thermomechanical drift.

Figure 11:
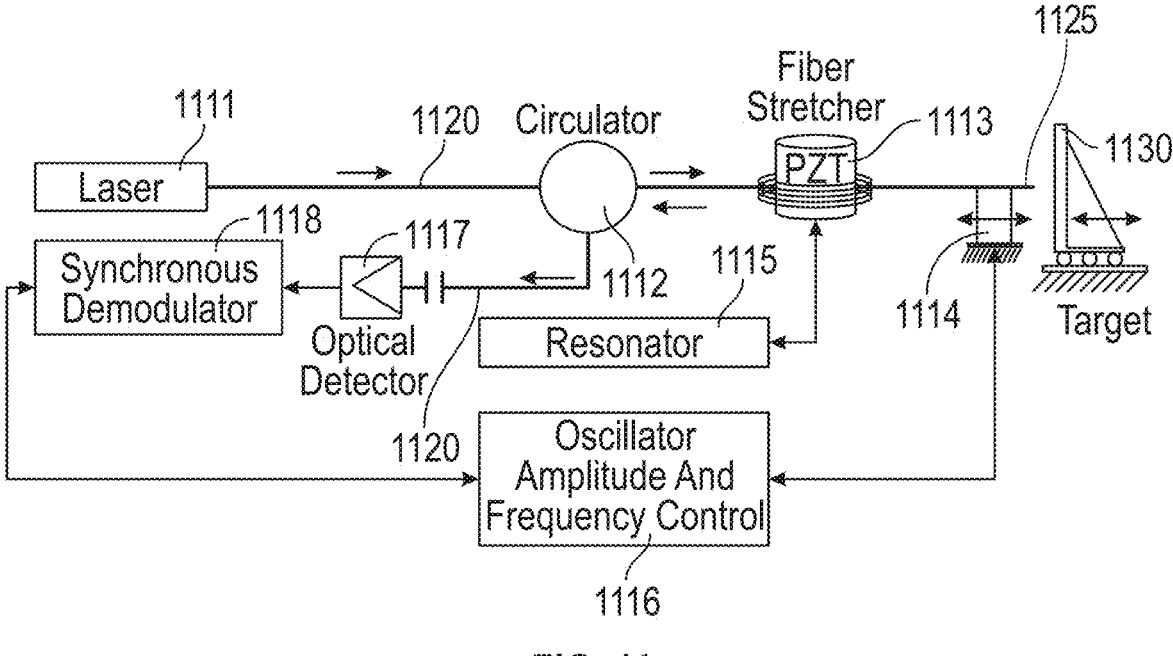
FIG. 11 is a schematic view of an interferometer system.

FIG. 11 is a schematic view of the interferometer system 1030. The interferometer system 1030 includes a laser source 1111 that generates a coherent light beam (e.g., a light beam that includes a specified wavelength). Additionally, the system 1030 includes an optical fiber 1120 coupled with the laser source 1111. The optical fiber 1120 is optionally coupled with one or more components of the system 1030 to facilitate the transmission of one or more beams of light between the components. In an example, the optical fiber 1120 optically couples the laser source 1111, a circulator 1112, a fiber stretcher 1113, an electromechanical oscillator 1114, and an optical detector 1117.

The circulator 1112 facilitates the transmission of optical signals within the system 1030. For instance, the circulator 1112 optionally directs the first coherent beam of light from the laser generator 1030 toward the target 1030. Additionally, the circulator 1112 optionally directs the first component beam and the second component beam (described herein) toward the optical detector 1117.

The fiber stretcher 1113 dynamically stretches the optical fiber 1120 to change a path length of one or more beams of light as the beams are transmitted through the optical fiber (e.g., the first coherent beam or the first and second component beams). The optical fiber 1120 includes a temperature sensitivity characteristic that causes a low frequency thermomechanical drift in measurements conducted with the system 1030. The fiber stretcher 1113 shifts the low frequency measurement to a higher frequency domain, where the higher frequency value is readily filtered to correct for thermomechanical drift within the system 1030.

In an example, the optical fiber 1120 is optionally wrapped around a piezoelectric element that expands and contracts with an application of current to the piezoelectric element. In this example, because the optical fiber 1120 is wrapped around the piezoelectric element, and the piezoelectric element expands and contracts, the path length of the optical fiber 1120 is correspondingly lengthened and shortened by the expansion and contraction of the piezoelectric element. A resonator 1115 is in communication with the fiber stretcher 1113 and supplies an electrical signal to the fiber stretcher 1113 to dynamically stretch the optical fiber 1120 (e.g., at several kilohertz).

As described herein, the system 1030 optionally includes the electromechanical oscillator 1114. The electromechanical oscillator 1114 modulates a cavity length (e.g., the distance between a fiber end 1125 and the target 130) that in turn modulates the interference signal (e.g., the interference signal is not purely sinusoidal). In an example, the optical fiber 1120 includes the fiber end 1125. The fiber end 1125 is optionally coupled with the electromechanical oscillator 1114 and the electromechanical oscillator 1114 modulates (e.g., oscillates, vibrates, or the like) the fiber end 1125 at a specified frequency and a specified amplitude. In an example, the modulation amplitude of the fiber end 1125 so that an amplitude of a demodulated interference signal at an operating frequency is equal to the amplitude of demodulated interference signal at double the operating frequency (e.g., the first harmonic). In another example, the fiber end 1125 modulates at a different multiple frequency of the operating frequency of the fiber stretcher 1113.

Referring again to FIG. 11, the fiber end 1125 is directed at the target 1130 to deliver the component beam (e.g., the second component beam, or active beam) toward the target 1130. The modulation of the fiber end 1125 by the electromechanical oscillator 1114 modulates the distance between the fiber end 1125 and the target 1130. Accordingly, the signal received by the optical detector 1117 (e.g., the combined first and second component beams) is modulated. Modulating the fiber end 1125 facilitates the removal of signal noise and improves the determination of the displacement between the fiber end 1125 and the target 1130 (e.g., between the second interferometer 1040B and the sample 300 shown in FIG. 3).

In an example, the synchronous demodulator 1118 samples the optical detector 1117 at the same frequency that the electromechanical oscillator 1114 modulates the fiber end 1125. In this example, because the fiber end 1125 is modulated, and the signal received by the optical detector 1117 is correspondingly modulated, synchronously demodulating the signal extends a displacement detection range between the fiber end 1125 and the target 1130 beyond single fringe interferometry. Accordingly, the determination of the distance (or displacement) of the target relative to the fiber end 1125 is thereby improved (e.g., the signal-to-noise ratio of the combined component beams is improved).

FIG. 12 shows one example of a method 1200 for correcting thermomechanical drift with a mechanical testing assembly having a sample stage and a mechanical testing instrument. In describing the method 1200, reference is made to one or more components, features, functions and operations previously described herein. Where convenient, reference is made to the components, features, operations and the like with reference numerals. The reference numerals provided are exemplary and are not exclusive. For instance, components, features, functions, operations and the like described in the method 1200 include, but are not limited to, the corresponding numbered elements provided herein and other corresponding elements described herein (both numbered and unnumbered) as well as their equivalents.

At 1210, a probe 310 of the mechanical testing instrument 114 is engaged with a sample 300 coupled with the sample stage (e.g., the multiple degree of freedom sample stage 116), wherein one or more of the mechanical testing instrument, the sample or the sample stage are subject to thermomechanical drift. At 1220, the engaged probe 310 is displaced relative to the sample 300 with a load. At 1230, one or more of the displacement or the load is measured. At 1240, one or more characteristics of the sample are determined with the probe according to the displacement and the load.

At 1250, the thermomechanical drift is corrected in one or more of the measured displacement of the probe with the sample (e.g., indentation depth, retraction length or the like) or the determined one or more characteristics. At 1260, correcting for the thermomechanical drift includes independently measuring a displacement of the probe relative to the system frame and independently measuring a displacement of the sample relative to the system frame with non-contact sensors. Several options for the method 1200 follow. In one example, correcting for the thermomechanical drift includes splitting a coherent beam of light from a laser source into at least first and second component beams. Additionally, correcting for the thermomechanical drift optionally includes directing the first component beam from a fiber end 1025 of a fiber 1020 against one of the mechanical testing instrument 114, sample 300 or the sample stage. Further, correcting for the thermomechanical drift optionally includes combining the first and second component beams. Still further, correcting for the thermomechanical drift optionally includes determining a differential displacement between the probe and the sample, and the phase difference corresponds to the thermomechanical drift of a component, such as the system frame 1010 where the fiber end 1025 is coupled with the mechanical testing instrument 114 (or 1040) and detects movement of the sample 300 (corresponding to the system frame 1010).

In one example, the method 1200 includes determining a displacement of the probe 310. For instance, a first interferometer is directed towards one of the probe 310 or an instrument housing of (e.g., the remainder of) the mechanical testing instrument 114 (or 1040). The second interferometer measures the displacement of the probe 310 relative to the remainder of the mechanical testing instrument 114 (or 1040). The difference (corresponding to thermomechanical drift of the system frame 1010 in an example) is used to determine the displacement of the probe 310 relative to the sample 300 and thereby isolate and remove thermomechanical drift.

Various Notes & Examples

Aspect 1 can include or use subject matter (such as an apparatus, a system, a device, a method, a means for performing acts, or a device readable medium including instructions that, when performed by the device, can cause the device to perform acts, or an article of manufacture), such as can include or use a probe heating jacket configured for heating a mechanical testing instrument having a probe, the probe heating jacket comprising: at least one fastening interface configured for coupling with the mechanical testing instrument; and a heating element extending from the at least one fastening interface, the heating element includes: a jacket wall coupled with the at least one fastening interface;

and the jacket wall extends around a probe recess, the jacket wall is configured to receive the probe of the mechanical testing instrument within the probe recess, and the heating element is mechanically isolated from the probe with a probe gap.

Aspect 2 can include or use, or can optionally be combined with the subject matter of Aspect 1, to optionally include or use wherein the jacket wall includes an interior surface facing the probe recess, and the interior surface is configured to direct heat across the probe gap to the probe.

Aspect 3 can include or use, or can optionally be combined with the subject matter of one or any combination of Aspects 1 or 2 to optionally include or use wherein the jacket wall is a radiative heating element.

Aspect 4 can include or use, or can optionally be combined with the subject matter of one or any combination of Aspects 1 through 3 to optionally include or use wherein the jacket wall is an inductive heating element.

Aspect 5 can include or use, or can optionally be combined with the subject matter of one or any combination of Aspects 1 through 3 to optionally include or use the mechanical testing instrument and the probe.

Aspect 6 can include or use, or can optionally be combined with the subject matter of Aspect 5 to optionally include or use wherein the probe is received in the probe recess of the jacket wall, the probe is mechanically isolated from the heating element, and the probe is spaced from the interior surface of the jacket wall by the probe gap.

Aspect 7 can include or use, or can optionally be combined with the subject matter of one or any combination of Aspects 5 or 6 to optionally include or use wherein the mechanical testing instrument is configured to move the probe within the probe recess, the probe movement mechanically isolated from the jacket wall.

Aspect 8 can include or use, or can optionally be combined with the subject matter of Aspect 7 to optionally include or use wherein the probe has one or more degrees of freedom relative to the heating jacket.

Aspect 9 can include or use, or can optionally be combined with the subject matter of one or any combination of Aspects 5 through 8 to optionally include or use wherein: the jacket wall includes a jacket profile; the probe includes a probe profile, and the probe profile corresponds with the jacket profile with the probe gap therebetween the heating element and the probe; and the jacket wall is in proximity to the probe, and surrounds the probe according to the corresponding jacket and probe profiles.

Aspect 10 can include or use subject matter (such as an apparatus, a system, a device, a method, a means for performing acts, or a device readable medium including instructions that, when performed by the device, can cause the device to perform acts, or an article of manufacture), such as can include or use a mechanical testing system, comprising: a mechanical testing instrument having a movable probe configured to test one or more mechanical properties of a sample of a material; a probe heating jacket configured for heating the mechanical testing system, the probe heating jacket including: at least one fastening interface configured for coupling with the mechanical testing instrument; a heating element extending from the at least one fastening interface, the heating element includes: a jacket wall coupled with the at least one fastening interface, the jacket wall extends around a probe recess, the jacket wall is configured to receive a probe of the mechanical testing instrument within the probe recess, and the heating element is mechanically isolated from the probe with a probe gap.

Aspect 11 can include or use, or can optionally be combined with the subject matter of Aspect 10, to optionally include or use wherein the mechanical testing system is configured to move the probe within the probe recess, the probe movement mechanically isolated from the jacket wall.

Aspect 12 can include or use, or can optionally be combined with the subject matter of Aspect 11 to optionally include or use wherein probe movement includes one or more of translation, rotation or lateral scratching movement within the probe recess, and the jacket wall mechanically isolates the probe with each of the one or more movements.

Aspect 13 can include or use, or can optionally be combined with the subject matter of one or any combination of Aspects 10 through 12 to optionally include or use wherein: the jacket wall includes a jacket profile; the probe includes a probe profile, and the probe profile corresponds with the jacket profile with the probe gap therebetween the heating element and the probe; and the jacket wall is in proximity to the probe, and surrounds the probe according to the corresponding jacket and probe profiles.

Aspect 14 can include or use, or can optionally be combined with the subject matter of Aspect 13 to optionally include or use wherein the heating element is a radiative heating element, a convective heating element, or an inductive heating element.

Aspect 15 can include or use, or can optionally be combined with the subject matter of one or any combination of Aspects 10 through 14 to optionally include or use an environmental conditioning chamber, wherein the chamber is configured to provide a conditioned environment, and the conditioned environment has one or more environmental characteristics that are different than a surrounding environment of the chamber.

Aspect 16 can include or use, or can optionally be combined with the subject matter of Aspect 15 to optionally include or use wherein the one or more environmental characteristics includes: temperature, pressure, humidity or fluid composition.

Aspect 17 can include or use, or can optionally be combined with the subject matter of one or any combination of Aspects 15 or 16 to optionally include or use wherein the probe heating jacket is positioned in the environmental conditioning chamber.

Aspect 18 can include or use subject matter (such as an apparatus, a system, a device, a method, a means for performing acts, or a device readable medium including instructions that, when performed by the device, can cause the device to perform acts, or an article of manufacture), such as can include or use a method for testing the mechanical properties of a material, comprising: positioning a probe of a mechanical testing instrument within a probe recess of a probe heating jacket having a jacket wall, wherein the jacket wall includes a jacket profile corresponding with a probe profile of the probe, and the jacket wall is proximate to the probe according to the correspondence of the jacket profile to the probe profile; energizing a heating element of the probe heating jacket; directing heat from the jacket wall to the probe through a probe gap according to the correspondence of the jacket profile to the probe profile to alter the temperature of the probe; moving the probe to perform a mechanical or electromechanical test; and wherein during movement of the probe, the probe is mechanically isolated from the jacket wall.

Aspect 19 can include or use, or can optionally be combined with the subject matter of Aspect 18, to optionally include or use wherein moving the probe includes one or more of translation, rotation or lateral scratching movement within the probe recess, and the jacket wall mechanically isolates the probe with each of the one or more movements.

Aspect 20 can include or use, or can optionally be combined with the subject matter of one or any combination of Aspects 18 or 19 to optionally include or use engaging the probe with a sample of a material.

Aspect 21 can include or use, or can optionally be combined with the subject matter of one or any combination of Aspects 18 through 20 to optionally include or use wherein engaging the probe with the sample includes applying a force to the probe with a mechanical testing instrument.

Aspect 22 can include or use subject matter (such as an apparatus, a system, a device, a method, a means for performing acts, or a device readable medium including instructions that, when performed by the device, can cause the device to perform acts, or an article of manufacture), such as can include or use a method for correcting for thermomechanical drift with a mechanical testing assembly having a sample stage and a mechanical testing instrument coupled to a system frame, the method comprising: engaging a probe of the mechanical testing instrument with a sample coupled with the sample stage, one or more of the mechanical testing instrument, the sample or the sample stage are subject to thermomechanical drift; displacing the engaged probe relative to the sample with a load; measuring one or more of the displacement or the load; determining one or more characteristics of the sample with the probe according to the displacement and the load; and correcting for the thermomechanical drift in one or more of the measured displacing of the probe with the sample or the determined one or more characteristics, correcting includes: independently measuring a displacement of the probe relative to the system frame and independently measuring a displacement of the sample relative to the system frame with non-contact sensors.

Aspect 23 can include or use, or can optionally be combined with the subject matter of Aspect 22, to optionally include or use wherein measuring the displacement of the probe or the displacement of the sample includes one or more of quadrature detection or fringe counting.

Aspect 24 can include or use, or can optionally be combined with the subject matter of one or any combination of Aspects 22 or 23 to optionally include or use wherein the non-contact sensors include one or more of a laser interferometer, a fiber light displacement sensor, a confocal sensor, or a capacitance sensor.

Aspect 25 can include or use, or can optionally be combined with the subject matter of one or any combination of Aspects 22 through 24 to optionally include or use wherein the non-contact sensor is a laser interferometer, and the independently measuring includes: generating a coherent beam of light into one or more optical fibers; transmitting the coherent beam of light through the one or more optical fibers to a fiber end; splitting the coherent beam of light into a first component beam and a second component beam; reflecting the first component beam off a fiber interface with a medium; reflecting the second component beam off the sample, the sample stage, or the mechanical testing instrument; and combining the first component beam and the second component beam at an optical detector; and determining a displacement of the sample, the sample stage, or the mechanical testing instrument relative to the system frame by synchronously demodulating the combined first component beam and the second component beam.

Aspect 26 can include or use, or can optionally be combined with the subject matter of one or any combination of Aspects 22 through 25 to optionally include or use wherein correcting for the thermomechanical drift includes at least one of active or passive correction for the engagement of the probe with the sample or measurement of the one or more characteristics, respectively.

Aspect 27 can include or use, or can optionally be combined with the subject matter of one or any combination of Aspects 22 through 26 to optionally include or use wherein correcting for the thermomechanical drift includes active correction for thermomechanical drift including translational driving of one or more of the probe or the sample in order to cancel out the thermomechanical drift.

Aspect 28 can include or use, or can optionally be combined with the subject matter of one or any combination of Aspects 22 through 27 to optionally include or use wherein correcting for the thermomechanical drift includes passive correction for thermomechanical drift including subtraction of the thermomechanical drift during the determining of the one or more characteristics of the sample.

Aspect 29 can include or use subject matter (such as an apparatus, a system, a device, a method, a means for performing acts, or a device readable medium including instructions that, when performed by the device, can cause the device to perform acts, or an article of manufacture), such as can include or use a system to correct for thermomechanical drift in a mechanical testing assembly, comprising: a system frame, wherein the system frame is subject to thermomechanical drift; a sample stage coupled with the system frame; a mechanical testing instrument coupled with the system frame, the mechanical testing instrument includes a movable probe configured to engage with a sample and displace a depth relative to the sample with a load; a laser interferometer system coupled with the mechanical testing instrument, the laser interferometer system includes: a first interferometer coupled between the probe and a remainder of the mechanical testing instrument, the first interferometer is configured to determine a probe displacement of the probe relative to the remainder of the mechanical testing instrument; a second interferometer coupled between the mechanical testing instrument and the system frame, the second interferometer is configured to determine a sample displacement of the sample stage or the sample relative to the mechanical testing instrument; and an isolation and measurement module configured to: determine a difference between the probe displacement and the sample displacement; isolate the mechanical testing instrument from the thermomechanical drift of the system frame using the determined difference between the probe displacement and the sample displacement.

Aspect 30 can include or use, or can optionally be combined with the subject matter of Aspect 29, to optionally include or use an electromechanical oscillator configured to oscillate a first fiber end or the second fiber end to provide a modulated optical signal.

Aspect 31 can include or use, or can optionally be combined with the subject matter of one or any combination of Aspects 29 or 30 to optionally include or use a fiber stretcher configured to dynamically stretch a fiber of the first interferometer or the second interferometer to mitigate thermally induced drift within the fiber.

Aspect 32 can include or use, or can optionally be combined with the subject matter of Aspect 31 to optionally include or use wherein the fiber stretcher includes an electromechanical element.

Aspect 33 can include or use, or can optionally be combined with any portion or combination of any portions of any one or more of Aspects 1 through 33 to include or use, subject matter that can include means for performing any one or more of the functions of Examples 1 through 20, or a machine-readable medium including instructions that, when performed by a machine, cause the machine to perform any one or more of the functions of Examples 1 through 20.

Each of these non-limiting examples can stand on its own, or can be combined in various permutations or combinations with one or more of the other examples.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A method for correcting for thermomechanical drift with a mechanical testing assembly having a sample stage and a mechanical testing instrument coupled to a system frame, the method comprising:
   engaging a probe of the mechanical testing instrument with a sample coupled with the sample stage, one or more of the mechanical testing instrument, the sample or the sample stage are subject to thermomechanical drift;
   displacing the engaged probe relative to the sample with a load;
   measuring one or more of the displacement or the load;
   determining one or more characteristics of the sample with the probe according to the displacement and the load; and
   correcting for the thermomechanical drift in one or more of the measured displacing of the probe with the sample or the determined one or more characteristics, correcting includes:
   independently measuring a displacement of the probe relative to the system frame and independently measuring a displacement of the sample relative to the system frame with non-contact sensors.

2. The method of claim 1, wherein measuring the displacement of the probe or the displacement of the sample includes one or more of quadrature detection or fringe counting.

3. The method of claim 1, wherein the non-contact sensors include one or more of a laser interferometer, a fiber light displacement sensor, a confocal sensor, or a capacitance sensor.

4. The method of claim 1, wherein the non-contact sensor is a laser interferometer, and the independently measuring includes:
   generating a coherent beam of light into one or more optical fibers;
   transmitting the coherent beam of light through the one or more optical fibers to a fiber end;

splitting the coherent beam of light into a first component beam and a second component beam;

reflecting the first component beam off a fiber interface with a medium;

reflecting the second component beam off the sample, the sample stage, or the mechanical testing instrument; and combining the first component beam and the second component beam at an optical detector; and determining a displacement of the sample, the sample stage, or the mechanical testing instrument relative to the system frame by synchronously demodulating the combined first component beam and the second component beam.

5. The method of claim 1, wherein correcting for the thermomechanical drift includes at least one of active or passive correction for the engagement of the probe with the sample or measurement of the one or more characteristics, respectively.

6. The method of claim 1, wherein correcting for the thermomechanical drift includes active correction for thermomechanical drift including translational driving of one or more of the probe or the sample in order to cancel out the thermomechanical drift.

7. The method of claim 1, wherein correcting for the thermomechanical drift includes passive correction for thermomechanical drift including subtraction of the thermomechanical drift during the determining of the one or more characteristics of the sample.

8. A system to correct for thermomechanical drift in a mechanical testing assembly, comprising:

a system frame, wherein the system frame is subject to thermomechanical drift;

a sample stage coupled with the system frame;

a mechanical testing instrument coupled with the system frame, the mechanical testing instrument includes a movable probe configured to engage with a sample and displace a depth relative to the sample with a load;

a laser interferometer system coupled with the mechanical testing instrument, the laser interferometer system includes:

a first interferometer coupled between the probe and a remainder of the mechanical testing instrument, the first interferometer is configured to determine a probe displacement of the probe relative to the remainder of the mechanical testing instrument;

a second interferometer coupled between the mechanical testing instrument and the system frame, the second interferometer is configured to determine a sample displacement of the sample stage or the sample relative to the mechanical testing instrument; and an isolation and measurement module configured to:

determine a difference between the probe displacement and the sample displacement;

isolate the mechanical testing instrument from the thermomechanical drift of the system frame using the determined difference between the probe displacement and the sample displacement.

9. The system of claim 8, further comprising an electromechanical oscillator configured to oscillate a first fiber end or the second fiber end to provide a modulated optical signal.

10. The system of claim 8, further comprising a fiber stretcher configured to dynamically stretch a fiber of the first interferometer or the second interferometer to mitigate thermally induced drift within the fiber.

11. The system of claim 10, wherein the fiber stretcher includes an electromechanical element.

12. A system to correct for thermomechanical drift in a mechanical testing assembly, comprising:

a system frame, wherein the system frame is subject to thermomechanical drift;

a sample stage coupled with the system frame;

a mechanical testing instrument coupled with the system frame, the mechanical testing instrument includes a movable probe configured to engage with a sample and displace a depth relative to the sample with a load; and a non-contact sensor configured to measure a displacement of the probe relative to the system frame and to measure a displacement of the sample relative to the system frame.

13. The system of claim 12, wherein the measurement of the displacement of the probe or the displacement of the sample includes one or more of quadrature detection or fringe counting.

14. The system of claim 12, wherein the non-contact sensors include one or more of a laser interferometer, a fiber light displacement sensor, a confocal sensor, or a capacitance sensor.

15. The system of claim 12, wherein the system is configured to correct for the thermomechanical drift by including at least one of active or passive correction for the engagement of the probe with the sample or measurement of the one or more characteristics, respectively.

16. The system of claim 12, wherein the system is configured to correct for the thermomechanical drift by including active correction for thermomechanical drift including translational driving of one or more of the probe or the sample in order to cancel out the thermomechanical drift.

17. The system of claim 12, wherein the system is configured to correct for the thermomechanical drift by including passive correction for thermomechanical drift including subtraction of the thermomechanical drift during a determination of one or more characteristics of the sample.

18. The system of claim 12, further comprising an environmental conditioning chamber, wherein the sample stage is disposed within the environmental conditioning chamber, wherein the chamber is configured to provide a conditioned environment, and the conditioned environment has one or more environmental characteristics that are different than a surrounding environment of the chamber.

19. The system of claim 18, wherein the one or more environmental characteristics includes: temperature, pressure, humidity or fluid composition.

20. The system of claim 18, wherein the one or more non-contact sensors; and the mechanical testing instrument are disposed within the environmental conditioning chamber.

* * * * *